United States Patent
Takeda et al.

(10) Patent No.: US 11,706,667 B2
(45) Date of Patent: *Jul. 18, 2023

(54) MULTICAST COMMUNICATIONS FOR RADIO RESOURCE CONTROL MODES

(71) Applicant: QUALCOMM Incorporated, San Diego, CA (US)

(72) Inventors: Kazuki Takeda, Minato-ku (JP); Alberto Rico Alvarino, San Diego, CA (US); Le Liu, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/047,902

(22) Filed: Oct. 19, 2022

(65) Prior Publication Data

US 2023/0062087 A1    Mar. 2, 2023

Related U.S. Application Data

(63) Continuation of application No. 16/987,338, filed on Aug. 6, 2020, now Pat. No. 11,510,109.

(Continued)

(51) Int. Cl.
*H04W 36/00*     (2009.01)
*H04W 76/27*     (2018.01)
(Continued)

(52) U.S. Cl.
CPC ......... *H04W 36/0007* (2018.08); *H04W 4/06* (2013.01); *H04W 72/0453* (2013.01); *H04W 76/27* (2018.02)

(58) Field of Classification Search
CPC ............... H04W 36/0007; H04W 4/06; H04W 72/0453; H04W 76/27; H04W 4/70;
(Continued)

(56) References Cited

U.S. PATENT DOCUMENTS 9,860,715 B2    1/2018  Han
2017/0325198 A1  11/2017 Adachi
(Continued)

FOREIGN PATENT DOCUMENTS

EP          3668127 A1     6/2020
WO    WO2019029511 A1     2/2019

OTHER PUBLICATIONS

Huawei, et al., "BWP Operation for V2X Sidelink," 3GPP Draft, 3GPP TSG RAN WG1 Meeting #96 bis, R1-1904690, 3rd Generation Partnership Project (3GPP), Mobile Competence Centre, 650, Route Des Lucioles, F-06921, Sophia-Antipolis Cedex, France, vol. RAN WG1, No. XI 'an, China; Apr. 8, 2019-Apr. 12, 2019, Apr. 2, 2019 (Apr. 2, 2019), XP051707283, 6 pages, the whole document.

(Continued)

*Primary Examiner* — Farid Seyedvosoghi
(74) *Attorney, Agent, or Firm* — Holland & Hart / Qualcomm

(57) ABSTRACT

Methods, systems, and devices for wireless communications are described. A communication device, otherwise known as a user equipment (UE) may receive signaling indicating a set of multicast configurations for a set of multicast modes supported by the UE. Each multicast mode of the set of multicast modes may be associated with one or more radio resource control (RRC) states. The UE may determine a multicast configuration of the set of multicast configurations based on an RRC state according to which the UE is operating. The UE may receive, while operating according to the RRC state, multicast data according to the determined multicast configuration.

30 Claims, 22 Drawing Sheets

Related U.S. Application Data

(60) Provisional application No. 62/885,113, filed on Aug. 9, 2019.

(51) Int. Cl.
  *H04W 72/0453* (2023.01)
  *H04W 4/06* (2009.01)

(58) Field of Classification Search
  CPC ..... H04W 72/30; H04W 76/40; H04W 80/00; H04L 12/185; H04L 12/189
  See application file for complete search history.

(56) References Cited

U.S. PATENT DOCUMENTS

| | | | |
|---|---|---|---|
| 2018/0139586 A1* | 5/2018 | Park | H04W 24/10 |
| 2020/0044723 A1 | 2/2020 | Cirik et al. | |
| 2021/0045017 A1 | 2/2021 | Takeda et al. | |

OTHER PUBLICATIONS

Huawei, et al., "Rel-17 Work Scope on NR Multicast and Broadcast Services", 3GPP Draft, 3GPP TSG RAN Meeting #84, RP-191012, Rel-17 Work Scope on NR Multicast and Broadcast Services, 3rd Generation Partnership Project (3GPP), Mobile Competence Centre, 650, Route Des Lucioles, F-06921, Sophia-Antipolis Cedex, France, vol. TSG RAN, No. Newport Beach, USA, Jun. 3, 2019-Jun. 7, 2019, Jun. 2, 2019 (Jun. 2, 2019), XP051747226, 8 pages, the whole document.

Huawei, et al., "Sidelink Physical Layer Structure for NR V2X," 3GPP Draft, 3GPP TSG RAN WG1 Ad-Hoc Meeting 1901, R1-1900022, 3rd Generation Partnership Project (3GPP), Mobile Competence Centre, 650, Route Des Lucioles, F-06921, Sophia-Antipolis Cedex, France, vol. RAN WG1, No. Taipei; Jan. 21, 2019-Jan. 25, 2019, Jan. 20, 2019 (Jan. 20, 2019), XP051592948, 12 pages, pp. 4-5, 5 Bandwidth parts pp. 5-7, 6 Resource pools pp. 8-9, 8.1 PSCCH figures 3,6.

International Preliminary Report on Patentability—PCT/US2020/045521 the International Bureau of WIPO—Geneva, Switzerland, dated Feb. 17, 2022.

International Search Report and Written Opinion—PCT/US2020/045521—ISA/EPO—dated Oct. 8, 2020.

* cited by examiner

MULTICAST COMMUNICATIONS FOR RADIO RESOURCE CONTROL MODES

CROSS REFERENCE

The present application for patent is a Continuation of U.S. patent application Ser. No. 16/987,338 by TAKEDA et al., entitled "MULTICAST COMMUNICATIONS FOR RADIO RESOURCE CONTROL MODES" filed Aug. 6, 2020, which claims the benefit of U.S. Provisional Patent Application No. 62/885,113 by TAKEDA et al., entitled "MULTICAST COMMUNICATIONS FOR RADIO RESOURCE CONTROL MODES," filed Aug. 9, 2019, assigned to the assignee hereof, and expressly incorporated by reference herein.

TECHNICAL FIELD

The following relates generally to wireless communications and more specifically to multicast communications for radio resource control (RRC) modes.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, each of which may be otherwise known as a user equipment (UE). Some wireless communications systems, such as NR systems, may support multiple radio resource control (RRC) modes (also referred to as RRC states), for example, an RRC connected mode, an RRC idle mode, or an RRC inactive mode. Some wireless communications systems may also support multicast communications to support various multicast service types in NR systems. In some wireless communications systems, communication devices may operate in a specific RRC state to support a specific multicast service type. As demand for multicast communication efficiency increases, some wireless communications systems may fail to support one or more multicast service types while operating in one or more RRC modes (for example, an RRC idle mode or an RRC inactive mode), and thereby may be unable to support the one or more multicast service types. Improved techniques are therefore desired.

SUMMARY

The described techniques relate generally to supporting multicast communications while in various operating states. In some examples, the described techniques may be used to configure a communication device, which may be a user equipment (UE), with one or more multicast configurations related to one or more multicast modes that may also correspond to one or more radio resource control (RRC) modes (also referred to as RRC states), such as an RRC connected mode, an RRC idle mode, or an RRC inactive mode. In some examples, the described techniques may be used to configure the communication device with a first multicast mode (for example, a "mode one") in which the communication device may receive multicast communications according to a multicast configuration while operating exclusively in the RRC connected mode. Additionally, in some examples, the described techniques may be used to configure the communication device with a second multicast mode (for example, a "mode two") in which the communication device may receive multicast communications according to a different multicast configuration while operating in any of the RRC modes (for example, any of the RRC connected mode, the RRC idle mode, or the RRC inactive mode). In some examples, the described techniques may be used to configure the communication device with both multicast modes. In some such examples in which two or more multicast modes may be configured, the communication device may operate, at any given time, in accordance with a particular one of the multicast modes or jointly under multiple multicast modes.

In some examples, the described techniques may be used to configure both multicast modes in accordance with a unified framework. In other words, the described techniques may be used to configure the multicast modes to share one or more common channel designs, configurations, or parameters. In some examples, the described techniques may be used to configure the common parameters of the multicast modes with varying parameter values or parameter ranges across the multicast modes. Alternatively, the described techniques may be used to configure the multicast modes in accordance with a separate framework. That is, the described techniques may be used to configure different channel designs, configurations, or parameters between different multicast modes. Based on such techniques, the communication device may be configured to support multicast communications in accordance with one or more multicast modes. The described techniques may thus include features for improvements to power consumption, spectral efficiency, higher data rates and, in some examples, may promote enhanced efficiency for high reliability and low latency multicast operations, among other benefits.

One innovative aspect of the subject matter described in this disclosure can be implemented in a method for wireless communication at a UE. The method may include receiving signaling indicating a set of multicast configurations for a set of multicast modes supported by the UE, each multicast mode of the set of multicast modes being associated with one or more RRC states, determining a multicast configuration of the set of multicast configurations based on an RRC state according to which the UE is operating, and receiving, while operating according to the RRC state, multicast data according to the determined multicast configuration. In some examples, the method may include receiving signaling indicating the multicast configuration in UE-dedicated signaling, and determining that the multicast configuration is associated with a first multicast mode of the set of multicast modes based on the signaling indicating the multicast configuration being received in UE-dedicated signaling. In some implementations, the method may include receiving signaling indicating the multicast configuration in signaling common to a set of UEs that include the UE, and determining that the multicast configuration is associated with a first multicast mode of the set of multicast modes based on the signaling indicating the multicast configuration being received in signaling common to the set of UEs.

Another innovative aspect of the subject matter described in this disclosure can be implemented in an apparatus for wireless communication. The apparatus may include a processor, memory coupled with the processor, and instructions stored in the memory. The instructions may be executable by the processor to cause the apparatus to receive signaling indicating a set of multicast configurations for a set of multicast modes supported by the apparatus, each multicast mode of the set of multicast modes being associated with one or more RRC states, determine a multicast configuration of the set of multicast configurations based on an RRC state according to which the UE is operating, and receive, while operating according to the RRC state, multicast data according to the determined multicast configuration. In some examples the processor may cause the apparatus to receive signaling indicating the multicast configuration in UE-dedicated signaling, and determine that the multicast configuration is associated with a first multicast mode of the set of multicast modes based on the signaling indicating the multicast configuration being received in UE-dedicated signaling. In some implementations, the processor may cause the apparatus to receive signaling indicating the multicast configuration in signaling common to a set of UEs that include the UE, and determine that the multicast configuration is associated with a first multicast mode of the set of multicast modes based on the signaling indicating the multicast configuration being received in signaling common to the set of UEs.

Another innovative aspect of the subject matter described in this disclosure can be implemented in a method of wireless communication at a base station base station. The method may include identifying, for a UE, a first multicast mode of a set of multicast modes supported by the base station, each multicast mode of the set of multicast modes associated with one or more RRC states, transmitting, to the UE, a multicast configuration according to the first multicast mode, and transmitting, to the UE, multicast data according to the transmitted multicast configuration. In some examples, the method may include identifying that the UE is to operate according to the first multicast mode to receive the multicast data, where the transmission of the multicast configuration indicating the first multicast mode includes signaling the multicast configuration in UE-dedicated signaling. In some implementations, the method may include identifying that the UE is to operate according to the first multicast mode to receive the multicast data, where the transmission of the multicast configuration indicating the first multicast mode includes signaling the multicast configuration in signaling common to a set of UEs, including the UE.

Another innovative aspect of the subject matter described in this disclosure can be implemented in an apparatus for wireless communication. The apparatus may include a processor, memory coupled with the processor, and instructions stored in the memory. The instructions may be executable by the processor to cause the apparatus to identify, for a UE, a first multicast mode of a set of multicast modes supported by the apparatus, each multicast mode of the set of multicast modes associated with one or more RRC states, transmit, to the UE, a multicast configuration according to the first multicast mode, and transmit, to the UE, multicast data according to the transmitted multicast configuration. In some examples, the processor may cause the apparatus to identify that the UE is to operate according to the first multicast mode to receive the multicast data, where the transmission of the multicast configuration indicating the first multicast mode includes signaling the multicast configuration in UE-dedicated signaling. In some implementations, the processor may cause the apparatus to identify that the UE is to operate according to the first multicast mode to receive the multicast data, where the transmission of the multicast configuration indicating the first multicast mode includes signaling the multicast configuration in signaling common to a set of UEs, including the UE.

DETAILED DESCRIPTION

Figure 1:
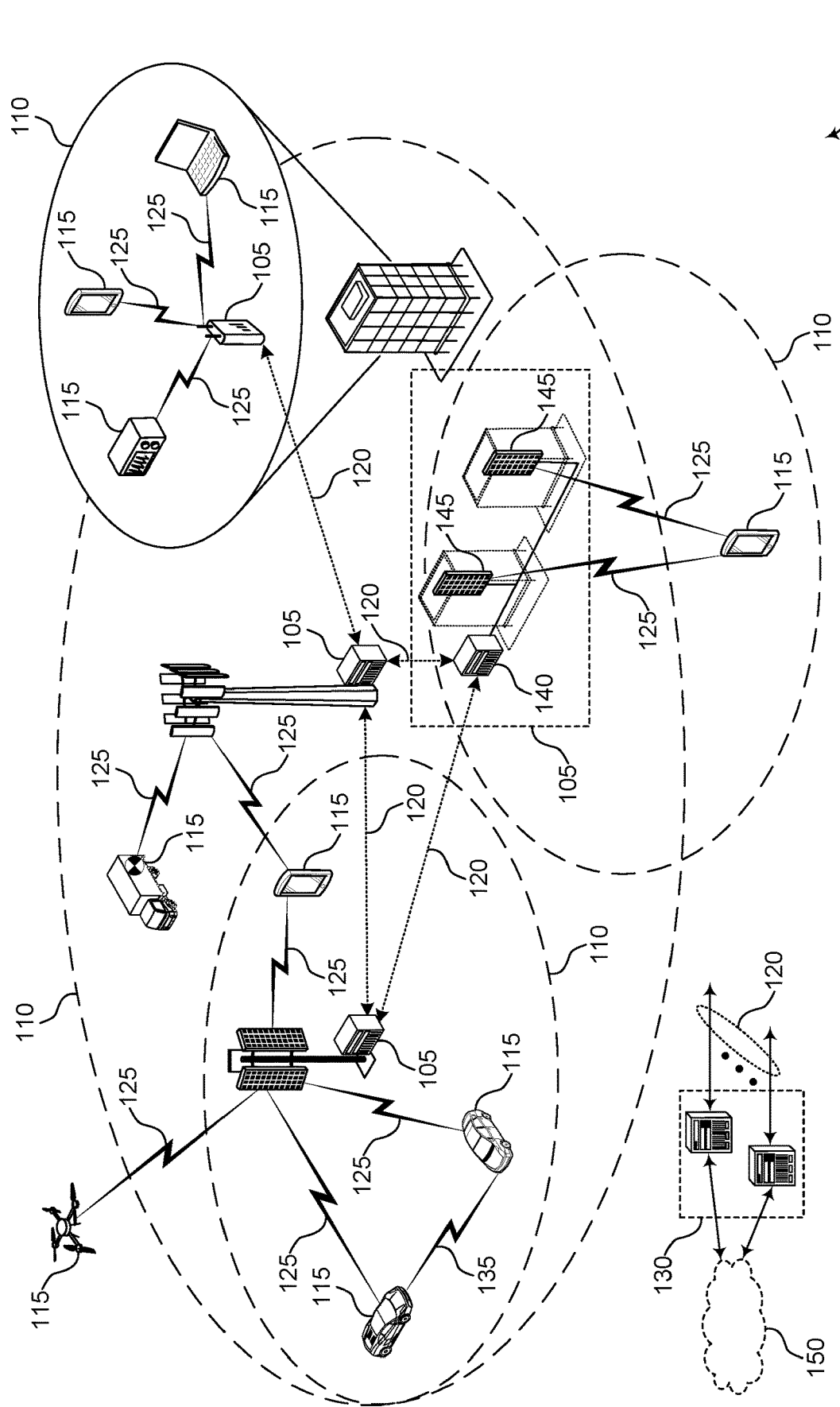
FIGS. 1 and 2 illustrate examples of wireless communications systems that support multicast communications for radio resource control (RRC) modes in accordance with aspects of the present disclosure.

Some wireless communication systems include communication devices, such as user equipments (UEs) and base stations, that may support multiple radio access technologies (RATs). For example, UEs and base stations, such as next-generation NodeBs or giga-NodeBs (either of which may be referred to as a gNB), may support 4G systems, such as Long Term Evolution (LTE) systems, and fifth generation (5G) systems, which may be referred to as New Radio (NR) systems. The UEs and base stations may support various radio resource control (RRC) modes (also referred to as RRC states), such as an RRC connected mode, an RRC idle mode, and an RRC inactive mode. The UEs and base stations may also support multicast communications to support various multicast services. As an example, a multicast service may include or involve a point-to-multipoint communication scheme in which information (for example, in the form of packets) is transmitted simultaneously from a single source (for example, a base station) to multiple destinations (for example, multiple UEs). A multicast service may additionally refer to a distribution of information to or among a specific group of communication devices (for example, a specific group of UEs) that are subscribed to the multicast service. In some examples, each of the UEs may be configured to operate under one or more of the above example RRC modes to support one or more different multicast service types. In such a manner, a UE may, in some examples, be configured to operate under a specific RRC mode to support a particular multicast service type.

A communication device (for example, a UE) may be configured to transmit feedback information (for example, a positive acknowledgment (ACK), a negative acknowledgement (NACK), or channel state information (CSI) feedback) about a multicast service. A multicast service may include various multicast service types such as software update services and low data rate common packet delivery in a wide area network (WAN), among other service types. In some examples, the UE may provide feedback to a base station regarding a quality or a performance of a multicast service, such as a common packet delivery in industrial Internet-of-Things (IOT) deployments, or a packet delivery in mission critical deployments including direct communications, such as device-to-device (D2D) communications or vehicle-to-everything (V2X) communications. In some other examples, the UE may provide feedback about a streaming multicast service (for example, a 4K or an 8K video streaming resolution service). In some cases, however, the UE may be unable to support the provision of feedback about a multicast service while operating under one or more RRC modes. For example, the UE may be unable to provide feedback on one or more of the above example multicast services while operating in an RRC idle mode or in an RRC inactive mode. As demand for multicast communication efficiency increases, the described techniques may address the above shortcomings, by configuring UEs to enable support of various multicast service types while operating in one or both of the RRC idle mode or the RRC inactive mode.

In some examples, the described techniques may be used to configure a UE with one or more multicast configurations corresponding to one or more multicast modes associated with one or more RRC modes, for example, an RRC connected mode, an RRC idle mode, or an RRC inactive mode. In some examples, a multicast configuration may correspond to a set of parameters related to reception and transmission of multicast communication while the UE is configured with a particular multicast mode. The multicast mode may correspond to one or more RRC modes in which the UE may operate when receiving multicast communications. In some examples, the described techniques may be used to configure multiple UEs with a first multicast mode (for example, a "mode one") in which the UEs may receive multicast communications in accordance with a multicast configuration while operating exclusively in one of the above example RRC modes (for example, the RRC connected mode). The described techniques may also be used to configure the UEs with a second multicast mode (for example, a "mode two") in which the UEs may receive multicast communications in accordance with a multicast configuration while operating in any two or more of the RRC modes. In some such examples, while operating in mode two, the UEs may receive multicast communications while operating in any of the RRC connected mode, the RRC idle mode, or the RRC inactive mode. In examples in which the UEs may be configured with two or more multicast modes, each of the UEs may operate in accordance with one of the multicast modes at any given time, or may jointly operate under multiple multicast modes.

Particular aspects of the subject matter described in this disclosure may be implemented to realize one or more of the following potential advantages. The disclosed techniques may provide benefits and enhancements to the operation of the communication devices. For example, various aspects presented in this disclosure may provide communication devices such as UEs with support for receiving multicast services while operating under various different RRC modes (for example, an RRC connected mode, an RRC idle mode, or an RRC inactive mode). By configuring UEs with multiple multicast modes, each associated with one or more RRC modes, some aspects facilitate or support reductions in power consumption, improved spectral efficiency, higher data rates or enhanced flexibility or efficiency for multicast operations, among other benefits. For example, by configuring the UEs with a multicast mode associated with all RRC modes, or with at least an RRC idle mode or an RRC inactive mode (rather than only with a multicast mode associated with the RRC connected mode), power consumption in a given UE may be reduced because the UE may be capable of receiving and otherwise supporting various multicast communications regardless of the RRC mode it is operating in. In this way, the UE may avoid having to switch between RRC modes, such as from an RRC idle mode to an RRC connected mode, to support the reception of a multicast service. Additionally, by configuring the described communication devices with multiple multicast modes, each multicast mode associated with one or more RRC modes, the described communication devices may experience enhanced efficiency for multicast operations because the described communication devices may mitigate latencies related to switching between RRC modes to support a multicast service.

Aspects of the disclosure are initially described in the context of wireless communications systems. Aspects of the disclosure are then illustrated by and described with reference to a process flow that relates to group scheduling. Aspects of the disclosure are further illustrated by and described with reference to apparatus diagrams, system diagrams, and flowcharts that relate to group scheduling in wireless communications systems.

FIG. 1 illustrates an example of a wireless communications system 100 that supports multicast communications for RRC modes in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and network equipment (for example, core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (for example, via an S1, N2, N3, or other interface). Base stations 105 may communicate with one another over backhaul links 120 (for example, via an X2, Xn, or other interface) either directly (for example, directly between base stations 105), or indirectly (for example, via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or among other examples, which may be implemented in various objects such as appliances, vehicles, meters, among other examples.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (for example, a bandwidth part (BWP)) that is operated according to physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by UEs 115. A carrier may be operated in a standalone mode in which initial acquisition and connection may be conducted by UEs 115 via the carrier, or the carrier may be operated in a non-standalone mode in which a connection is anchored using a different carrier (for example, of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, base stations 105, UEs 115, or both) may have hardware configurations that support communications over a particular carrier bandwidth or may be configurable to support communications over one of a set of carrier bandwidths. In some examples, the wireless communications system 100 may include base stations 105 and UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, in which the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, in which a numerology may include a subcarrier spacing (Δf) and a cyclic prefix. A carrier may be divided into BWPs having the same or different numerologies. In some examples, a UE 115 may be configured with multiple BWPs. In some examples, a single BWP for a carrier is active at a given time, and communications for the UE 115 may be restricted to active BWPs.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell may also refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the base station 105. For example, a cell may be or include a building, a subset of a building, exterior spaces between or overlapping with geographic coverage areas 110, among other examples.

A macro cell generally covers a relatively large geographic area (for example, several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to UEs 115 with service subscriptions with the network provider or may provide restricted access to UEs 115 having an association with the small cell (for example, UEs 115 in a closed subscriber group (CSG), UEs 115 associated with users in a home or office, among other examples). A base station 105 may support one or multiple cells and may also support communications over the one or more cells using one or multiple component carriers. In some examples, a carrier may support multiple cells, and different cells may be configured according to different protocol types (for example, MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a predefined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

The wireless communications system 100 may be configured to support multicast communications. UEs 115 may receive a number of multicast configurations for a number of multicast modes supported by the UEs 115. In some examples, each multicast mode of the number of multicast modes may relate to one or more RRC states. The UEs 115 may determine a multicast configuration based on the RRC state. Accordingly, the UEs 115 may receive, while operating according to the RRC state, multicast data according to the determined multicast configuration.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other examples, D2D communications are carried out between UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, D2D transmissions, among other examples.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), in which multiple spatial layers are transmitted to the same receiving device, and multiple-user MIMO (MU-MIMO), in which multiple spatial layers are transmitted to multiple devices.

Beamforming, which may also be referred to as spatial filtering, directional transmission, or directional reception, is a signal processing technique that may be used at a transmitting device or a receiving device (for example, a base station 105 or a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or a receiving device, such as a UE 115) a beam direction for subsequent transmission and reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some examples, transmissions by a device (for example, by a base station 105 or UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, in which the device may provide HARQ feedback in a specific slot for data received in a previous symbol in the slot. In other examples, the device may provide HARQ feedback in a subsequent slot, or according to some other time interval.

Figure 2:
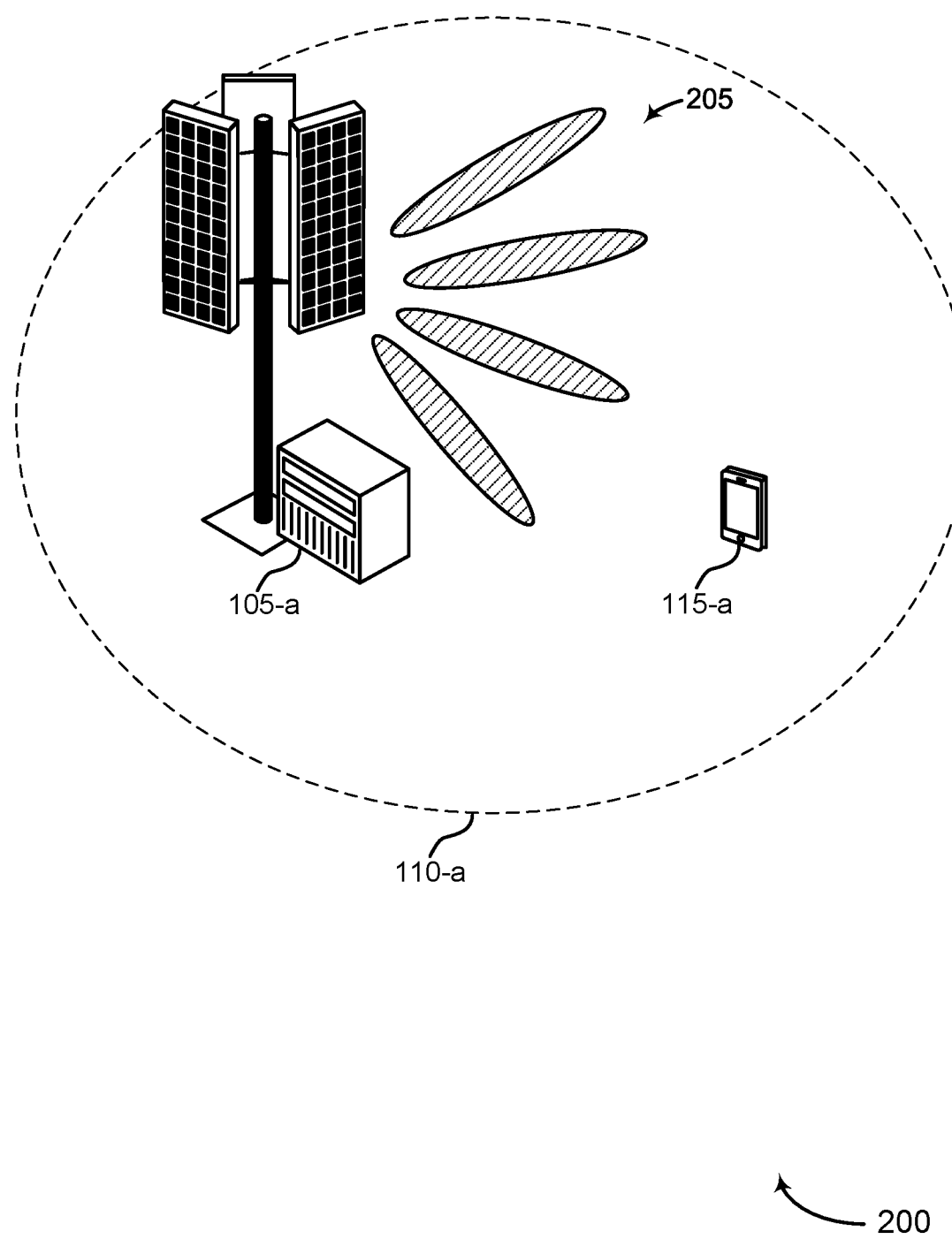

FIG. 2 illustrates an example of a wireless communications system 200 that supports multicast communications for RRC modes in accordance with aspects of the present disclosure. The wireless communications system 200 may include a base station 105-a and a UE 115-a within a geographic coverage area 110-a. The base station 105-a and the UE 115-a may be examples of the corresponding devices described with reference to FIG. 1. In some examples, the wireless communications system 200 may support multiple radio access technologies including 4G systems such as LTE systems, LTE-A systems, or LTE-A Pro systems, and 5G systems which may be referred to as NR systems. In some examples, the wireless communications system 200 may be a multimedia broadcast multicast service (MBMS) network or a multimedia broadcast multicast service (MBMS) single frequency network (MBSFN). In some examples, the wireless communications system 200 may implement aspects of the wireless communications system 100. For example, the UE 115-a in the wireless communications system 200 may support multicast communications in accordance with one or more multicast modes. In some examples, the base station 105-a may broadcast, to the UE 115-a, multicast communications via one or more directional beams 205 (for example, downlink directional beams). As a result, the UE 115-a may support improvements to power consumption, spectral efficiency, higher data rates and, in some examples, may promote enhanced efficiency for high reliability and low latency multicast operations, among other benefits.

In the example of FIG. 2, the UE 115-a may support various RRC modes to preserve resources (for example, time and frequency resources of the wireless communications system 200), a battery life of the UE 115-a, among other examples. An RRC mode may include one or more of an RRC connected mode, an RRC idle mode, and an RRC inactive mode. In the RRC connected mode, the UE 115-a may have an active connection with the base station 105-a. While in the RRC connected mode, the UE 115-a may receive from or transmit to the base station 105-a multicast service-related information (for example, a multicast content, a multicast service request, among other examples). Additionally, while in the RRC connected mode, the base station 105-a may manage mobility and handover of the UE 115-a to other cells (for example, other base stations). In the RRC idle mode, the UE 115-a may not have an active connection with the base station 105-a. The base station 105-a may, however, enable the UE 115-a (for example, via a wakeup signal or another mechanism) to power on and establish an active connection with the base station 105-a to receive multicast service-related information, for example, based on having a previous active connection with the UE 115-a. The RRC inactive mode may provide benefits to the base station 105-a and the UE 115-a by reducing a duration to switch the UE 115-a to the RRC connected mode, for example, from the RRC idle mode. In other words, in the RRC inactive mode, the UE 115-a may be awake and operate under a lower power mode compared to the RRC connected mode, but under a higher power mode compared to the RRC idle mode.

The base station 105-a may, in some examples, configure the UE 115-a with one or more multicast modes that may correspond to one or more of the above example RRC modes, for example, an RRC connected mode, an RRC idle mode, or an RRC inactive mode. In some examples, the base station 105-a may configure the UE 115-a with a first multicast mode (for example, a "mode one") in which the UE 115-a may receive multicast communications when exclusively operating in one of the above example RRC modes (for example, the RRC connected mode). In some other examples, the base station 105-a may configure the UE 115-a with a second multicast mode (for example, a "mode two") in which the UE 115-a may receive multicast communications when operating in any of the RRC modes (for example, the RRC connected mode, the RRC idle mode, or the RRC inactive mode). In some other examples, the base station 105-*a* may configure the UE 115-*a* with two or more multicast modes, and the UE 115-*a* may operate in accordance with at least one of the multicast modes or jointly under multiple multicast modes.

In some examples, the base station 105-*a* may configure the UE 115-*a* with one or more multicast modes (or multicast configurations) via RRC configuration. That is, the base station 105-*a* may, as part of an RRC procedure, configure the UE 115-*a* with one or more of a multicast mode or a set of parameters related to reception and transmission of multicast communications. In some examples, the base station 105-*a* may determine a set of RRC parameters for the UE 115-*a*, which the UE 115-*a* may use to receive multicast communications (for example, multicast content) from the base station 105-*a*. Examples of one or more RRC parameters may include MIMO related information (for example, a number of layers, beamforming information, such as a quasi co-location (QCL) assumption or TCI state, among other examples), demodulation reference signal (DMRS) related information (for example, a DMRS sequence generation parameter, a DMRS configuration type, a PDSCH mapping type, among other examples), a modulation and coding scheme (MCS) (for example, an MCS table), resource allocation (RA) related information (for example, a resource allocation type, enabling or disabling a resource mapping (for example, virtual resource block (VRB) to physical resource block (PRB) mapping)), enabling or disabling a frequency hopping scheme, among other examples), a transport block size (TBS) related information (for example, one or more rate matching parameters, an overhead configuration parameter, among other examples), transmission configuration indicator (TCI) state related information, or feedback related information (for example, an ACK, a NACK, or a channel state information (CSI) related parameters, a physical uplink control channel (PUCCH) resource configuration, a PUCCH resource set configuration, a beamforming information (for example, spatial relation information), among other examples), among other examples. The base station 105-*a* may thus transmit the set of RRC parameters in an RRC message to the UE 115-*a* via UE-dedicated RRC signaling. In some examples, the UE-dedicated signaling may include a dedicated physical channel allocated to the UE 115-*a* for uplink communications from the UE 115-*a* to the base station 105-*a*, and downlink communications from the base station 105-*a* to the UE 115-*a*.

The base station 105-*a* may, in some examples, include the set of RRC parameters in a configuration message. In some examples, the base station 105-*a* may include the set of RRC parameters in one or more of a serving cell configuration or a BWP configuration, among other examples. Examples of configuration messages related to a multicast mode are described with reference to FIGS. 3-5.

Figure 3:
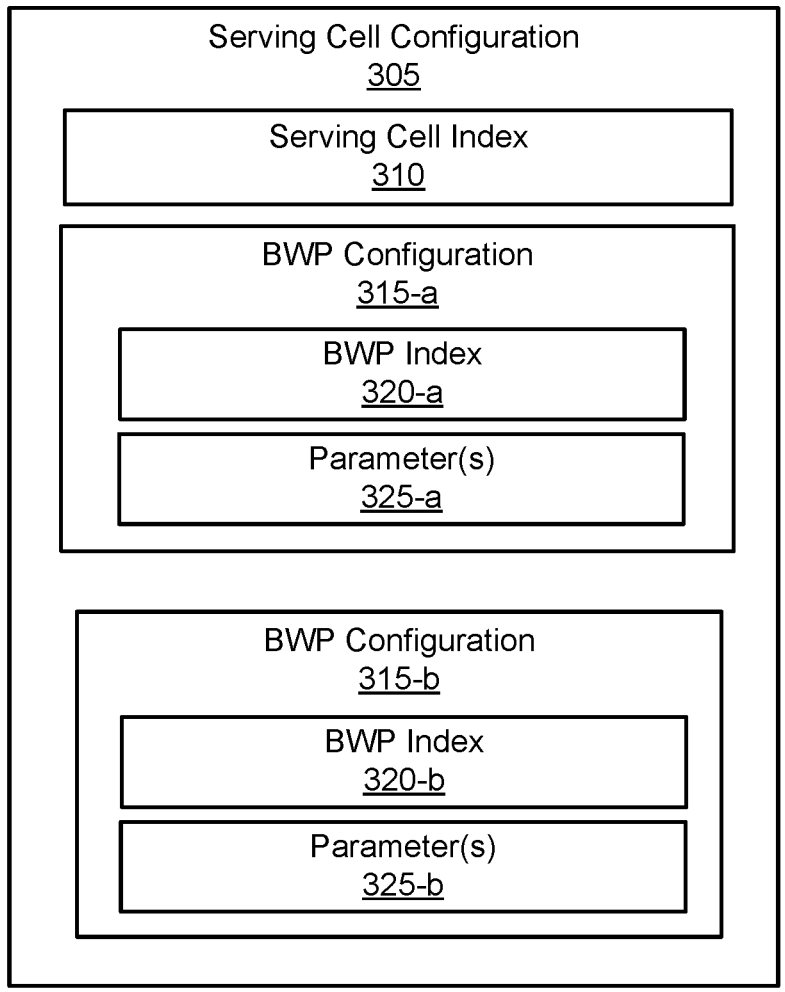
FIGS. 3-7 illustrate examples of multicast configurations that support multicast communications for RRC modes in accordance with aspects of the present disclosure.

FIG. 3 illustrates an example of a configuration message 300 that supports multicast communications for RRC modes in accordance with aspects of the present disclosure. The configuration message 300 may support aspects of the wireless communications system 200, as described with reference to FIG. 2. For example, the configuration message 300 may be based on a configuration by the base station 105-*a* or the UE 115-*a*, and implemented by the UE 115-*a*. In some examples, the base station 105-*a* may configure the UE 115-*a* with multiple BWP configurations for a serving cell.

A BWP may be defined as a contiguous set of physical resource blocks (PRBs) on a given carrier. The PRBs may be selected from a contiguous subset of common resource blocks for a given numerology, which may have a set of different parameters including a subcarrier spacing, a symbol duration, and a cyclic prefix length. In some examples, the base station 105-*a* may configure the UE 115-*a* with multiple BWPs for downlink and uplink, but at a given point of time only one BWP may be active for downlink and one for uplink. BWPs may therefore enable the UE 115-*a* to operate in narrow bandwidth, but when the UE 115-*a* demands more data (for example, more multicast traffic), the UE 115-*a* can inform the UE 115-*a* to activate another BWP with a wider bandwidth. A serving cell may correspond to the base station 105-*a* or another base station (not shown). In some examples, the base station 105-*a* may support a mobility of the UE 115-*a* across different serving cells within a same frequency or on different frequencies or even on different radio access technologies (for example, 4G systems, 5G systems).

If the UE 115-*a* is configured by the base station 105-*a* with multiple BWP configurations for the serving cell (for example, the geographic coverage area 110-*a*), the base station 105-*a* may configure RRC parameters for each BWP configuration, which the UE 115-*a* may use for receiving multicast communications. For example, the configuration message 300 may include a serving cell configuration 305 and a serving cell index 310, which may identify the serving cell (for example, may correspond to a serving cell identifier). The serving cell configuration 305 may include multiple BWP configurations including a BWP configuration 315-*a* and a BWP configuration 315-*b*. The UE 115-*a* may identify each BWP configuration 315 based on a BWP index 320. For example, the UE 115-*a* may identify the BWP configuration 315-*a* based on a BWP index 320-*a* associated with the BWP configuration 315-*a*, and may also identify the BWP configuration 315-*b* based on a BWP index 320-*b* associated with the BWP configuration 315-*b*. In some examples, a BWP configuration may be a BWP downlink, a BWP downlink common, or a BWP downlink dedicated. Similarly, the serving cell configuration 305 may be a serving cell configuration, a serving cell configuration common, or a serving cell configuration dedicated.

As illustrated in FIG. 3, each BWP configuration 315 may have a separate set of parameters 325. That is, each BWP configuration 315 may have a unique set of parameters 325 for receiving multicast communications. By way of example, the BWP configuration 315-*a* may have one or more parameters 325-*a*, and the BWP configuration 315-*b* may have one or more parameters 325-*b*. In some examples, the BWP configurations 315 may share one or more common parameters 325 (for example, an MCS, a TBS related information, among other examples). The UE 115-*a* may thus receive multicast communications (for example, multicast content) according to the configuration for an active BWP.

Figure 4:
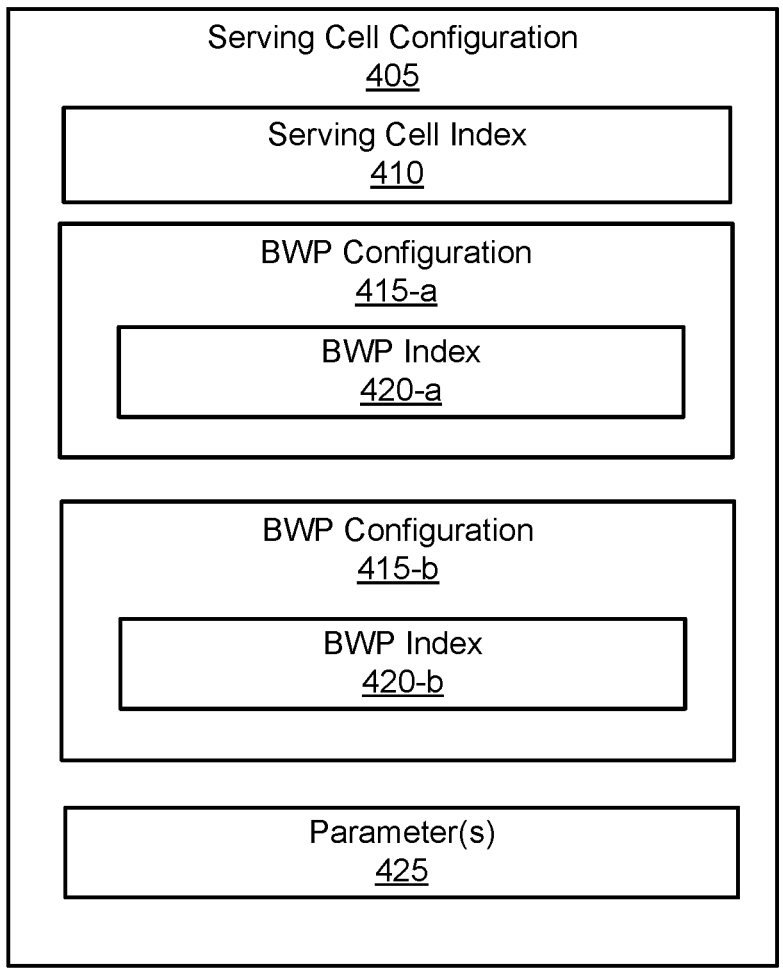

FIG. 4 illustrates an example of a configuration message 400 that supports multicast communications for RRC modes in accordance with aspects of the present disclosure. The configuration message 400 may support aspects of the wireless communications system 200, as described with reference to FIG. 2. For example, the configuration message 400 may be based on a configuration by the base station 105-*a* or the UE 115-*a*, and implemented by the UE 115-*a*. The configuration message 400 may include a serving cell configuration 405 and a serving cell index 410, which may identify the serving cell (for example, may correspond to a serving cell identifier). The serving cell configuration 405 may include multiple BWP configurations including a BWP configuration 415-*a* and a BWP configuration 415-*b*. The UE 115-*a* may identify each BWP configuration 415 based on a BWP index 420. For example, the UE 115-*a* may identify the BWP configuration 415-*a* based on a BWP index 420-*a* associated with the BWP configuration 415-*a*, and may also identify the BWP configuration 415-*b* based on a BWP index 420-*b* associated with the BWP configuration 415-*b*.

As outlined above, in some examples, the base station 105-*a* may configure the UE 115-*a* with the multiple BWP configurations 415 for the serving cell. In the example of FIG. 4, however, the base station 105-*a* may configure one or more parameters 425 (for example, one or more RRC parameters) that may be common for all the BWP configurations 415, which the UE 115-*a* may use for receiving multicast communications. Additionally, in the example of FIG. 4, the base station 105-*a* may include the one or more parameters 425 as part of the serving cell configuration 405. For example, the serving cell configuration 405 may include one or more additional fields, in which the base station 105-*a* may include (configure) the one or more parameters 425. Thus, even if the UE 115-*a* is configured with more than one BWP configuration 415 for the serving cell, one or more parameters 425 (for example, one or more RRC parameters) for receiving multicast communications can be provided for the serving cell, and the parameters 425 are used for any active BWP. That is, the UE 115-*a* may receive multicast communications according to a BWP configuration 415 for the serving cell regardless of the active BWP.

Figure 5:
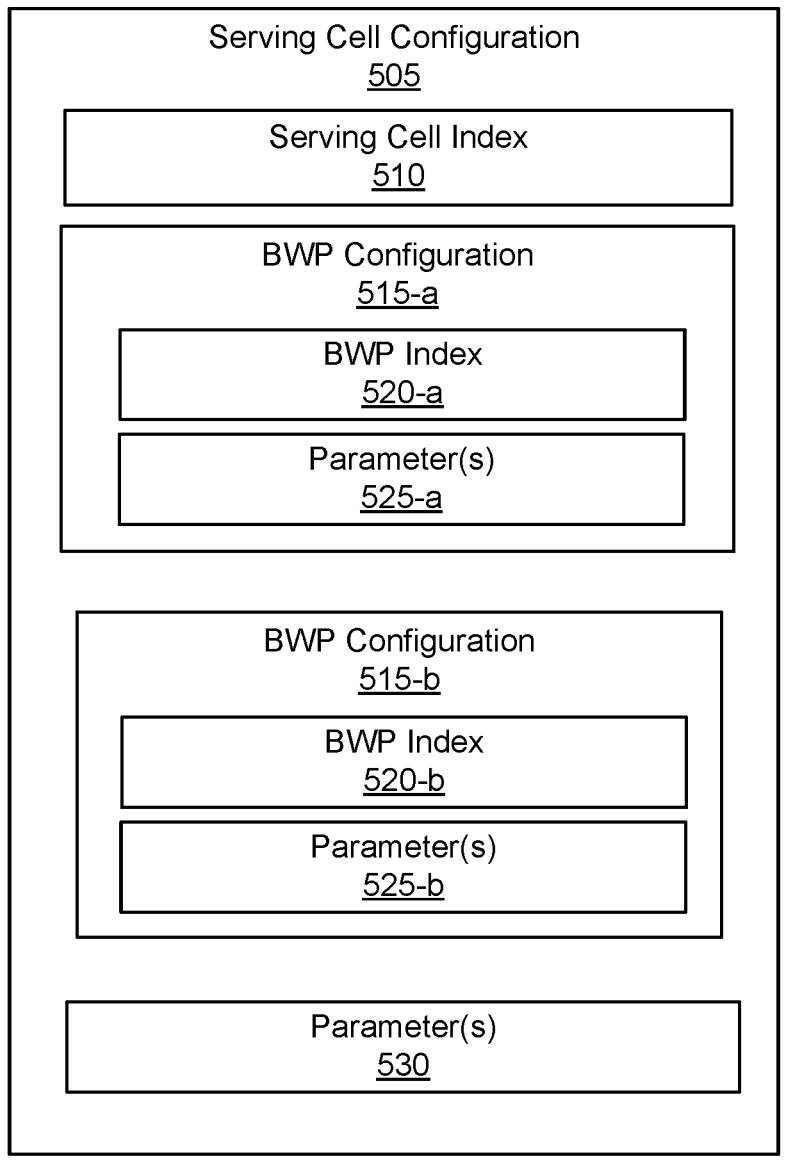

FIG. 5 illustrates an example of a configuration message 500 that supports multicast communications for RRC modes in accordance with aspects of the present disclosure. The configuration message 500 may support aspects of the wireless communications system 200, as described with reference to FIG. 2. For example, the configuration message 500 may be based on a configuration by the base station 105-*a* or the UE 115-*a*, and implemented by the UE 115-*a*. The configuration message 500 may include a serving cell configuration 505 and a serving cell index 510, which may identify the serving cell (for example, may correspond to a serving cell identifier). The serving cell configuration 505 may include multiple BWP configurations including a BWP configuration 515-*a* and a BWP configuration 515-*b*. The UE 115-*a* may identify each BWP configuration 515 based on a BWP index 520. For example, the UE 115-*a* may identify the BWP configuration 515-*a* based on a BWP index 520-*a* associated with the BWP configuration 515-*a*, and may also identify the BWP configuration 515-*b* based on a BWP index 520-*b* associated with the BWP configuration 515-*b*.

The configuration message 500 may, in some examples, combine one or more aspects of a configuration message, as described with reference to FIGS. 3 and 4. For example, as illustrated in FIG. 5, each BWP configuration 515 may have a separate set of parameters 525. That is, each BWP configuration 515 may have a unique set of parameters 525 for receiving multicast communications. By way of example, the BWP configuration 515-*a* may have one or more parameters 525-*a*, and the BWP configuration 515-*b* may have one or more parameters 525-*b*. In some examples, the BWP configurations 515 may share one or more common parameters 525 (for example, an MCS, a TBS related information, among other examples). The UE 115-*a* may thus receive multicast communications (for example, multicast content) according to the configuration for an active BWP.

Additionally, the configuration message 500 may include (configure) one or more parameters 530 (for example, one or more RRC parameters) as part of the serving cell configuration 505. The one or more parameters 530 may be common to the one or more parameters 525 associated with the different BWP configurations 515. Alternatively, the one or more parameters 530 may be unique compared to the one or more parameters 525 associated with the different BWP configurations 515. For example, the one or more parameters 525 (for example, an MCS, a TBS, RA related information, among other examples) may be different compared to the one or more parameters 530 (for example, TCI state related information, DMRS related information, among other examples).

Thus, in the example of FIG. 5, some parameters can be provided as part of a BWP configuration which are effective only when the BWP is active. In other examples, some parameters can be provided as part of a serving cell configuration which are effective regardless of the active BWP. In some examples, some of the parameters (for example, one or more of the parameter(s) 525 or the parameter(s) 530) may be commonly applied to both multicast reception and unicast reception. In some examples, once the base station 105-*a* configures the UE 115-*a* with one or more of the parameter(s) 525 or the parameter(s) 530, the UE 115-*a* may apply one or more of the parameter(s) 525 or the parameter(s) 530 for receiving both multicast communications and unicast communications.

Returning to FIG. 2, in some examples, the base station 105-*a* may transmit multicast communications (for example, multicast content) via a physical channel. For example, the base station 105-*a* may transmit the multicast communications via a physical downlink shared channel (PDSCH) (also referred to as a multicast PDSCH). In some examples, the base station 105-*a* may enable the UE 115-*a* to receive the multicast communications via the multicast PDSCH based on one or more criteria, which may include receiving the multicast communications over an active downlink BWP.

Figure 6:
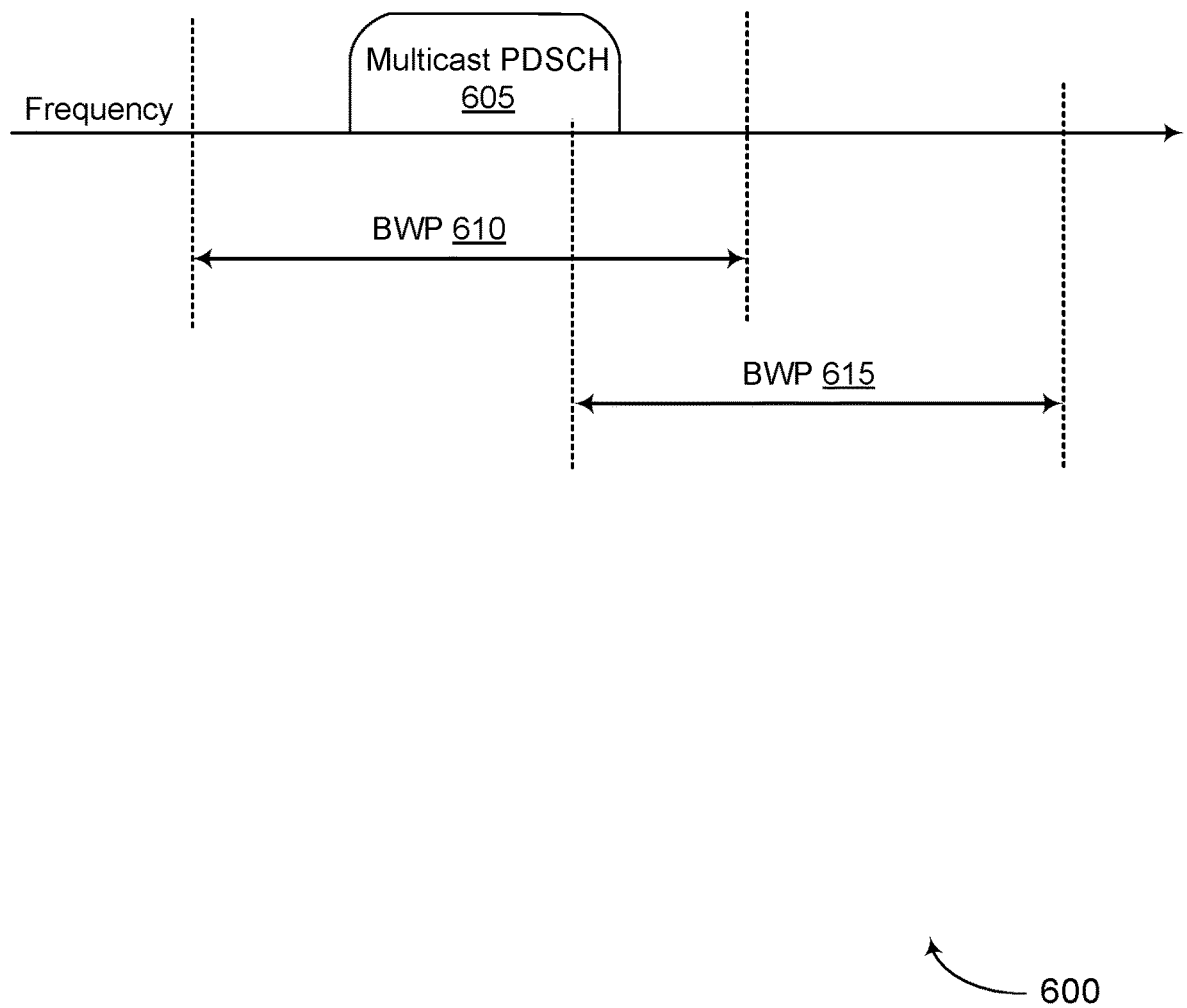

FIG. 6 illustrates an example of a BWP configuration 600 that supports multicast communications for RRC modes in accordance with aspects of the present disclosure. The BWP configuration 600 may support aspects of the wireless communications system 200, as described with reference to FIG. 2. For example, the BWP configuration 600 may be based on a configuration by the base station 105-*a* and implemented by the UE 115-*a*. In some examples, the base station 105-*a* may transmit multicast communications via a multicast PDSCH 605. The UE 115-*a* may, in some examples, receive the multicast communications in a current active downlink BWP. In the example of FIG. 6, the BWP configuration 600 may include multiple BWPs. For example, the BWP configuration may include a BWP 610 and a BWP 615. The BWP 610 and the BWP 615 may be defined by a number of time and frequency resources, as described herein.

In some examples, if the multicast PDSCH 605 is not included in an active downlink BWP (for example, the BWP 615), the UE 115-*a* may refrain from switching the active downlink BWP to another downlink BWP to receive the multicast PDSCH 605. As a result, the UE 115-*a* may not receive multicast communications via the multicast PDSCH 605. In some other examples, if the multicast PDSCH 605 is not included in the active downlink BWP, the UE 115-*a* may switch to another downlink BWP in which the multicast PDSCH 605 is receivable. For example, the UE 115-*a* may switch from the BWP 615 to the BWP 610 to receive the multicast PDSCH 605. In some other examples, the base station 105-*a* (for example, the network) may ensure that the multicast PDSCH 605 is included in the active downlink BWP. If it is not, the base station 105-*a* may indicate a BWP switching to the UE 115-*a*, so that the multicast PDSCH 605 is included in the active downlink BWP. That is, the base station 105-*a* may transmit an indication to the UE 115-*a* to switch BWPs, for example, to switch from the BWP 615 to the BWP 610 to receive the multicast PDSCH 605.

Returning to FIG. 2, in some examples, the base station 105-*a* may configure one or more search spaces to transmit multicast-related communications (for example, multicast control information) via a physical channel. For example, the base station 105-*a* may configure the one or more search spaces to transmit the multicast-related communications via a physical downlink control channel (PDCCH) or a PDSCH. In some examples, the base station 105-*a* may enable the UE 115-*a* to monitor the one or more search spaces to decode and receive the multicast-related communications via the PDCCH or the PDSCH. In some examples, the base station 105-*a* may configure the UE 115-*a* to monitor the one or more search spaces in an active BWP (for example, an active downlink BWP).

Figure 7:
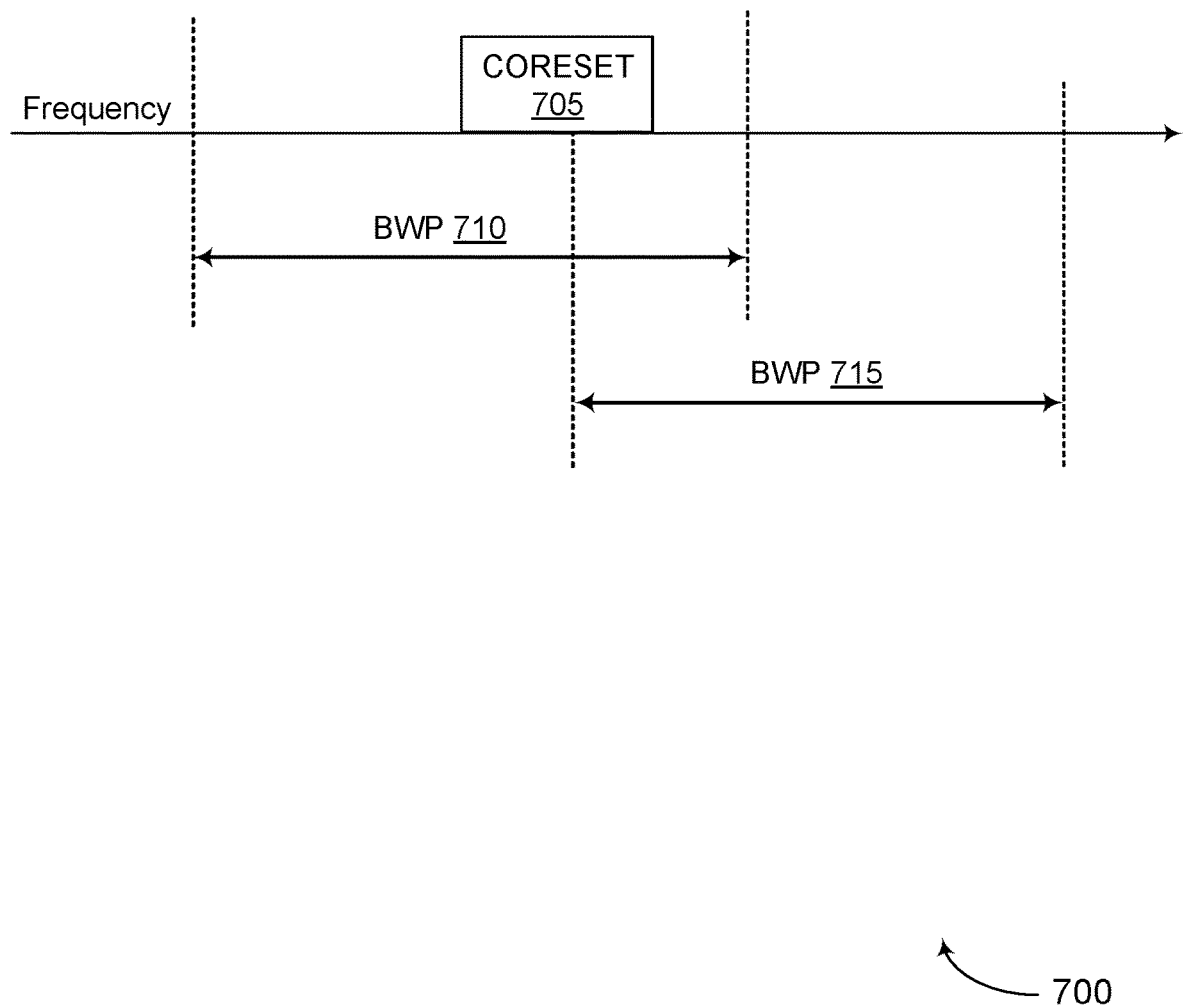

FIG. 7 illustrates an example of a BWP configuration 700 that supports multicast communications for RRC modes in accordance with aspects of the present disclosure. The BWP configuration 700 may support aspects of the wireless communications system 200, as described with reference to FIG. 2. For example, the BWP configuration 700 may be based on a configuration by the base station 105-*a* and implemented by the UE 115-*a*. In some examples, the base station 105-*a* may transmit multicast communications over one or more search spaces. A search space may correspond to one or more control regions (for example, one or more control resource sets (CORESET)), which may be for a physical control channel (for example, a PDCCH) and may be defined by a number of symbol periods and may extend across a system bandwidth or a subset of the system bandwidth of a carrier (for example, over a set of frequency resources or subcarriers).

One or more control regions (for example, CORESETs) may be configured for multiple UEs that may be subscribed to a multicast service. For example, the UE 115-*a* may monitor or search control regions for control information according to one or more search spaces, and each search space may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. The search space may include a common search space configured for sending control information to multiple UEs 115 and a UE-specific search space for sending control information to a specific UE 115 (for example, the UE 115-*a*).

In the example of FIG. 7, the UE 115-*a* may monitor a CORESET 705 to decode and receive multicast communications from the base station 105-*a*. In some examples, the UE 115-*a* may monitor the CORESET 705 in an active BWP (for example, an active downlink BWP). In some examples, if the CORESET 705 for the multicast communications is not included in an active downlink BWP (for example, a BWP 715), the UE 115-*a* may refrain from switching the active downlink BWP to another downlink BWP to monitor the CORESET 705. That is, the UE 115-*a* may not be required to monitor the CORESET 705. In some other examples, if the CORESET 705 for the multicast communications is not included in the active downlink BWP, the UE 115-*a* may switch to another downlink BWP in which the UE 115-*a* may monitor the CORESET 705 for the multicast communications. For example, the UE 115-*a* may switch from the BWP 715 (for example, an active downlink BWP) to a BWP 710 (which becomes the active downlink BWP for the UE 115-*a*). In some other examples, the base station 105-*a* (for example, the network) may ensure that the CORESET 705 for the multicast communications is included in the active downlink BWP. If it is not, the base station 105-*a* may indicate a BWP switching to the UE 115-*a*, so that the CORESET 705 is included in the active downlink BWP. That is, the base station 105-*a* may transmit an indication to the UE 115-*a* to switch BWPs, for example, to switch from the BWP 715 to the BWP 710 to monitor the CORESET 705 and receive the multicast communications.

Returning to FIG. 2, in some examples, the base station 105-*a* may transmit multicast-related communications (for example, multicast control information) via a control signaling. In some examples, the control signaling may include downlink control information (DCI) signaling. The base station 105-*a* may, in some examples, configure a size (for example, a payload size) of a DCI for the multicast-related communications to be common among multiple UEs 115 (for example, the UE 115-*a* and other UEs 115 associated with a multicast service). In some examples, the base station 105-*a* (or the UE 115-*a*) may determine the size of the DCI carrying the multicast-related communications according to a configuration of the multicast service. For example, the base station 105-*a* (or the UE 115-*a*) may determine the size of the DCI based in part on one or more of a BWP size, a resource allocation type, or a DMRS configuration, among other examples. In some other examples, if UEs 115 of a multicast service have different configurations (for example, different BWP sizes, different resource allocation types, among other examples), each UE 115 may have a different size of DCI. The base station 105-*a* may be responsible for handling a DCI size alignment.

In some examples, the base station 105-*a* may determine the size of the DCI for the multicast-related communications according to a configuration for unicast communications. For example, the base station 105-*a* (or the UE 115-*a*) may determine the size of the DCI based in part on one or more of a BWP size, a resource allocation type, or a DMRS configuration, among other examples associated with the unicast communications. Similarly, if UEs 115 of a multicast service have different configurations (for example, different BWP sizes or different resource allocation types, among other examples associated with the unicast communications), each UE 115 may have a different size of DCI. The base station 105-*a* may also be responsible for handling a DCI size alignment.

The base station 105-*a* may, in some examples, configure the size of the DCI for the multicast-related communications based on a default DCI format. For example, the base station 105-*a* may configure the size of the DCI for the multicast-related communications to be a same size as the default DCI format. Examples of default DCI formats may include, but are not limited to, a DCI format 0_0 and a DCI format 1_0, among other examples. The UE 115-*a* may, therefore, determine the size of the DCI based on the default DCI format. In some other examples, the base station 105-*a* may configure the size of the DCI for the multicast-related communications via an RRC configuration. That is, a value of the DCI size may be configured as part of the RRC configuration for multicast communications. For example, the UE 115-*a* may determine the size of the DCI according to an RRC parameter configuring the size of the DCI. The UE 115-*a* may perform blind decoding to decode and receive a DCI based on the size of the DCI. In some examples, if a particular field in the DCI has a smaller number of bits (or a larger number of bits) than a threshold, the UE 115-*a* may truncate or pad (for example, zero pad) the field to fulfill the total DCI size.

In some examples, the base station 105-*a* may configure the UE 115-*a* to support feedback of the multicast communications (for example, ACK/NACK feedback). For example, the UE 115-*a* may support the ACK/NACK feedback when operating in an RRC connected mode. The base station 105-*a* may, in some examples, configure the UE 115-*a* with one or more RRC parameters for the ACK/NACK feedback via UE-dedicated RRC signaling. For examples, the base station 105-*a* may, in some examples, configure the UE 115-*a* with one or more of a PUCCH resource allocation (for example, PUCCH resource(s), PUCCH resource set(s)), an ACK/NACK codebook, or a PUCCH spatial relation information, among other examples. In some examples, the base station 105-*a* may include, and the UE 115-*a* may receive, the one or more RRC parameters in a BWP configuration. The BWP configuration may be an uplink BWP configuration, which may be paired with a downlink BWP configuration for reception of the multicast communications. Alternatively, the base station 105-*a* may include, and the UE 115-*a* may receive, the one or more RRC parameters in a serving cell configuration. Additionally or alternatively, the base station 105-*a* may include, and the UE 115-*a* may receive, the one or more RRC parameters in the BWP configuration and the serving cell configuration. In some examples, some of the RRC parameters may be commonly applied to both reception of the multicast communications and reception of unicast communications.

As described herein, the base station 105-*a* may, in some examples, configure the UE 115-*a* with a second multicast mode (for example, a "mode two") in which the UE 115-*a* may receive multicast communications when operating in at least one RRC mode (for example, the RRC connected mode, the RRC idle mode, or the RRC inactive mode). Similarly to configuring the first multicast mode, the base station 105-*a* may determine a set of RRC parameters for the UE 115-*a*, which the UE 115-*a* may use to receive multicast communications (for example, multicast content) from the base station 105-*a*. In some examples, when configuring the UE 115-*a* with the second multicast mode, the base station 105-*a* may transmit the set of RRC parameters in a message to the UE 115-*a* via UE-common RRC signaling. In some examples, the UE-common signaling may include a common physical channel allocated to multiple UEs 115 including the UE 115-*a*. In some examples, the UE-common RRC signaling may include a system information block (SIB) or a multicast control channel (MCCH) carried by a PDSCH. In some examples, the UE 115-*a* may receive one or more of the SIB or the MCCH in a default downlink BWP of a primary cell (for example, of the base station 105-*a*). In some other examples, the UE 115-*a* may receive one or more of the SIB or the MCCH in an active downlink BWP, for example, as long as the active downlink BWP has a same numerology (for example, a subcarrier spacing, a symbol duration) as the default downlink BWP, and the active downlink BWP fully includes the default downlink BWP.

In some examples, the base station 105-*a* may include, and the UE 115-*a* may receive, the one or more RRC parameters associated with the second multicast mode in a BWP configuration of the default downlink BWP. Alternatively, the base station 105-*a* may include, and the UE 115-*a* may receive, the one or more RRC parameters associated with the second multicast mode in a serving cell configuration. In some other examples, the base station 105-*a* may include, and the UE 115-*a* may receive, the one or more RRC parameters associated with the second multicast mode in the BWP configuration and the serving cell configuration. In some examples, some of the RRC parameters may be commonly applied to both reception of the multicast communications and reception of unicast communications. That is, once the RRC parameters are configured, the UE 115-*a* may apply the RRC parameters for receiving both multicast communications and unicast communications.

The base station 105-*a* may, in some examples, configure a size of a DCI for multicast-related communications to be common among all UEs 115 including the UE 115-*a*. Similarly to the first multicast mode configuration, the base station 105-*a* may configure the size of the DCI based on a default DCI format. For example, the base station 105-*a* may configure the size of the DCI for the multicast-related communications to be a same size as the default DCI format. Examples of default DCI formats may include, but are not limited to, a DCI format 0_0 and a DCI format 1_0, among other examples. In some other examples, the base station 105-*a* may configure the size of the DCI for the multicast-related communications according to a parameter configuring the size of the DCI. That is, a value of the DCI size may be configured as part of an RRC configuration for multicast communications (for example, in a SIB or an MCCH). The UE 115-*a* may perform blind decoding to decode and receive a DCI based on the size of the DCI. In some examples, if a particular field in the DCI has a smaller number of bits (or a larger number of bits) than a threshold, the UE 115-*a* may truncate or pad (for example, zero pad) the field to fulfill the total DCI size.

As described herein, in some implementations, the base station 105-*a* may configure the UE 115-*a* with both multicast modes (for example, the first multicast mode and the second multicast mode), and the UE 115-*a* may operate in accordance with at least one of the multicast modes or jointly under both multicast modes. In some examples, if the UE 115-*a* is configured with the first multicast mode on and the second multicast mode, the UE 115-*a* may manage operating in accordance with at least one of the multicast modes or both based on one or more criteria. For example, if the UE 115-*a* receives multicast communications according to a configuration for the second multicast mode, the UE 115-*a* may override the second multicast mode with the first multicast mode. In some examples, the UE 115-*a* may override the second multicast mode with the first multicast mode when a collision happens, for example, in timing between monitoring for the multicast communications according to both the first multicast mode and the second multicast mode. Alternatively, the UE 115-*a* may exclusively monitor for the multicast communications according to the first multicast mode (with a configured time window). In some other examples, the UE 115-*a* may receive the multicast communications jointly according to both the first multicast mode and the second multicast mode.

The base station 105-*a* may therefore configure the UE 115-*a* to support multicast communications in accordance with one or more multicast modes when operating under an RRC mode (for example, an RRC connected mode, an RRC idle mode, or an RRC inactive mode). The base station 105-*a* and the UE 115-*a* thus support one or more features for improvements to power consumption, spectral efficiency, higher data rates and, in some examples, may promote enhanced efficiency for multicast operations, among other benefits.

Figure 8:
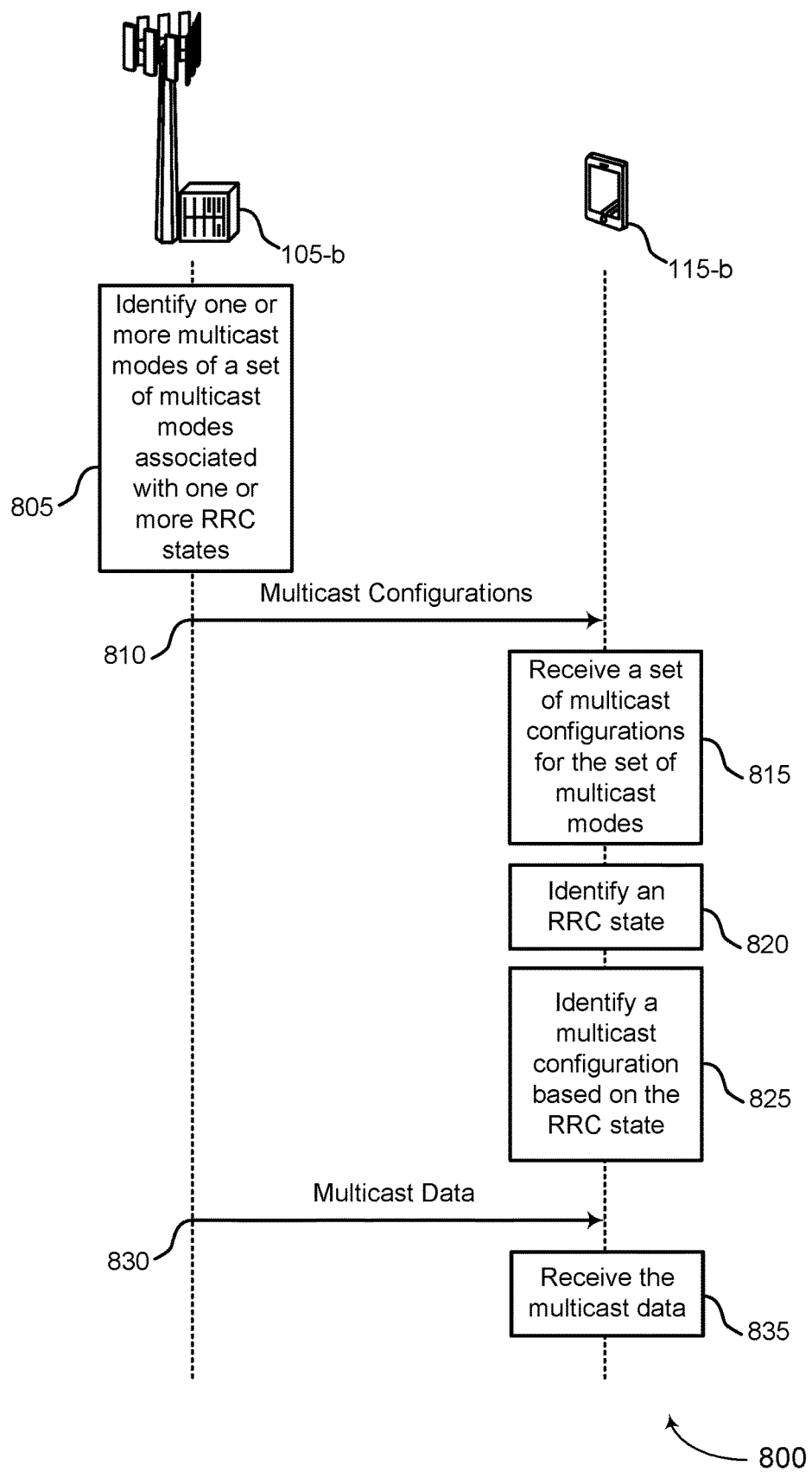
FIG. 8 illustrates an example of a process flow that supports multicast communications for RRC modes in accordance with aspects of the present disclosure.

FIG. 8 illustrates an example of a process flow 800 that supports multicast communications for RRC modes in accordance with aspects of the present disclosure. The process flow 800 may support aspects of the wireless communications system 100 and 200, as described with reference to FIGS. 1 and 2. For example, the process flow 800 may be based on a configuration by a base station 105 or a UE 115, and implemented by the UE 115. The process flow 800 may involve a base station 105-*b* and a UE 115-*b*, which may be examples of base stations 105 and UEs 115, respectively, as described with reference to FIGS. 1 and 2. In the following description of the process flow 800, the operations performed by the base station 105-*b* and the UE 115-*b* may be performed in different orders or at different times. Some operations may also be omitted from the process flow 800, and other operations may be added to the process flow 800.

At 805, the base station 105-*b* may identify one or more multicast modes of a set of multicast modes associated with one or more RRC states. At 810, the base station 105-*b* may transmit a set of multicast configurations to the UE 115-*b*. At 815, the UE 115-*b* may receive a set of multicast configurations for the set of multicast modes. At 820, the UE 115-*b* may identify an RRC state. For example, the UE 115-*b* may identify an RRC state that the UE 115-*b* is operating under, such as an RRC idle state or an RRC connected state. At 825, the UE 115-*b* may identify a multicast configuration based on the RRC state. At 830, the base station 105-*b* may transmit multicast data to the UE 115-*b*. At 835, the UE 115-*b* may receive the multicast data from the base station 105-*b*. For example, the UE 115-*b* may receive the multicast data, while operating according to the RRC state, as well as according to the multicast configuration.

The operations performed by base station 105-*b* and the UE 115-*b* as part of, but not limited to, the process flow 800 may provide improvements to multicast communications. Furthermore, the operations performed by the base station 105-*b* and the UE 115-*b* as part of, but not limited to, the process flow 800 may provide benefits and enhancements to the operation of the UE 115-*b*. For example, by configuring the UE 115-*b* with one or more multicast modes that may correspond to one or more RRC modes may support improvements to power consumption, spectral efficiency, higher data rates and, in some examples, may promote enhanced efficiency for multicast operations, among other benefits.

Figure 9:
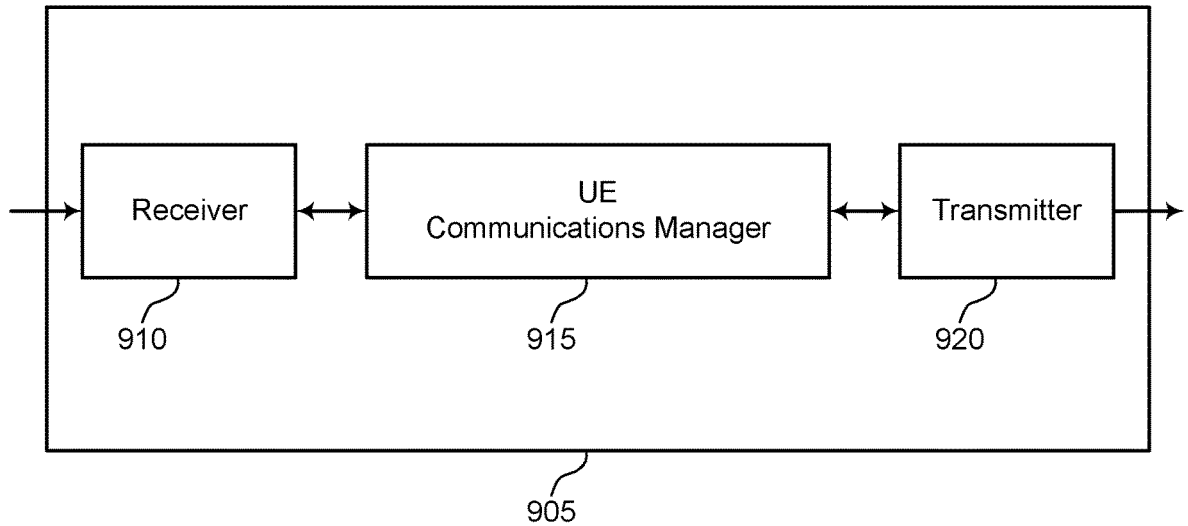
FIGS. 9 and 10 show block diagrams of devices that support multicast communications for RRC modes in accordance with aspects of the present disclosure.

FIG. 9 shows a block diagram of a device 905 that supports multicast communications for RRC control modes in accordance with aspects of the present disclosure. The device 905 may be an example of aspects of a UE 115 as described herein. The device 905 may include a receiver 910, a UE communications manager 915, and a transmitter 920. The UE communications manager 915 can be implemented, at least in part, by one or both of a modem and a processor. Each of these components may be in communication with one another (for example, via one or more buses).

The receiver 910 may receive information such as packets, user data, or control information associated with various information channels (for example, control channels, data channels, and information related to multicast communications for RRC modes). Information may be passed on to other components of the device 905. The receiver 910 may be an example of aspects of the transceiver 1220 described with reference to FIG. 12. The receiver 910 may utilize a single antenna or a set of antennas.

The UE communications manager 915 may receive signaling indicating a set of multicast configurations for a set of multicast modes supported by the UE, each multicast mode of the set of multicast modes being associated with one or more RRC states, identify an RRC state of the UE, determine a multicast configuration of the set of multicast configurations based on the RRC state according to which the UE is operating, and receive, while operating according to the RRC state, multicast data according to the determined multicast configuration.

The UE communications manager 915 may be implemented as an integrated circuit or chipset for the device 905 modem, and the receiver 910 and the transmitter 920 may be implemented as analog components (for example, amplifiers, filters, antennas) coupled with the device 905 modem to enable wireless transmission and reception. The UE communications manager 915 may be implemented to realize one or more potential improvements. At least one implementation may enable the UE communications manager 915 to receive multicast data when operating according to various RRC modes. Based on implementing the receiving, one or more processors of the device 905 (for example, processor(s) controlling or incorporated with the UE communications manager 915) may promote improvements to power consumption, spectral efficiency, higher data rates and, in some examples, may promote enhanced efficiency for multicast operations, among other benefits.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
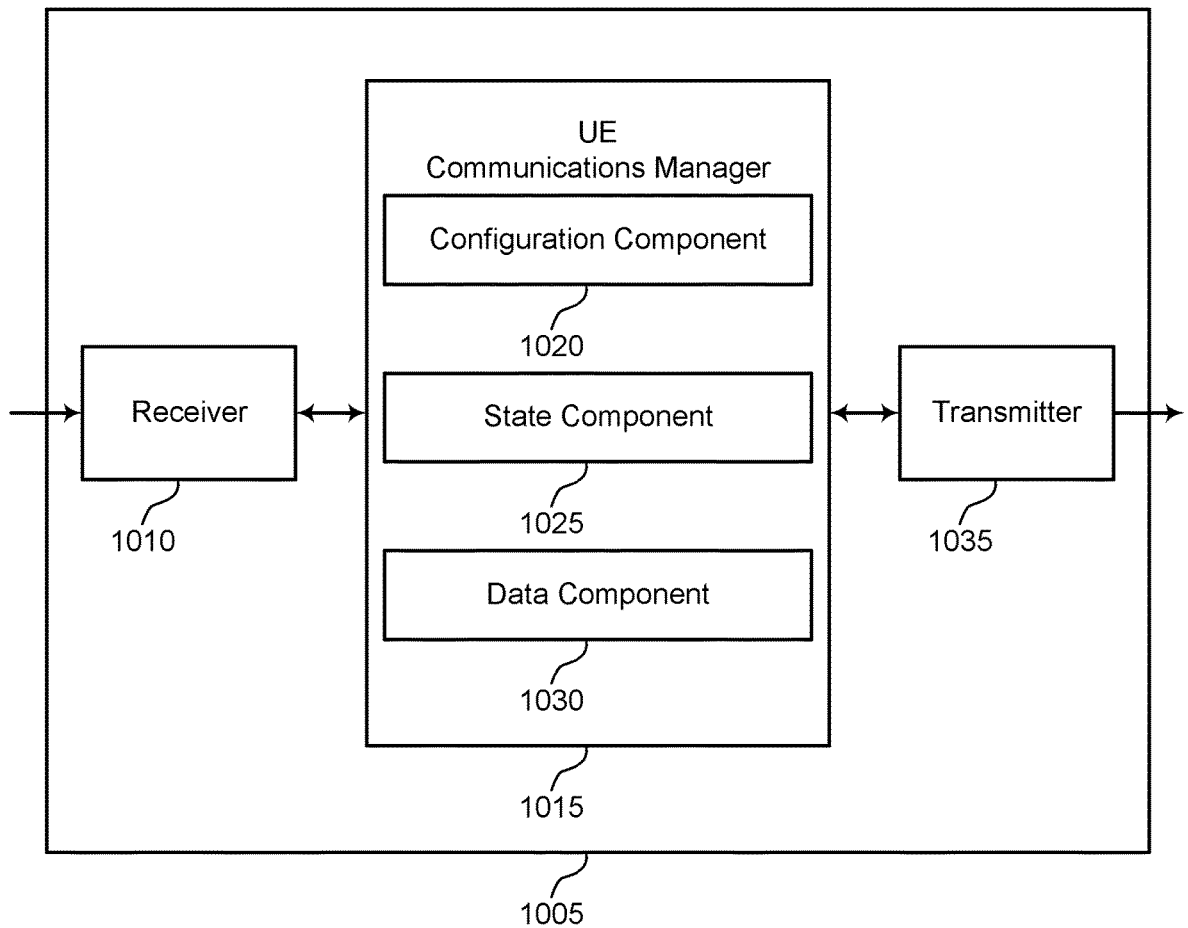

FIG. 10 shows a block diagram of a device 1005 that supports multicast communications for RRC modes in accordance with aspects of the present disclosure. The device 1005 may be an example of aspects of a device 905, or a UE 115 as described herein. The device 1005 may include a receiver 1010, a UE communications manager 1015, and a transmitter 1035. The UE communications manager 1015 can be implemented, at least in part, by one or both of a modem and a processor. Each of these components may be in communication with one another (for example, via one or more buses).

The receiver 1010 may receive information such as packets, user data, or control information associated with various information channels (for example, control channels, data channels, and information related to multicast communications for RRC modes). Information may be passed on to other components of the device 1005. The receiver 1010 may be an example of aspects of the transceiver 1220 described with reference to FIG. 12. The receiver 1010 may utilize a single antenna or a set of antennas.

The UE communications manager 1015 may include a configuration component 1020, a state component 1025, and a data component 1030.

The configuration component 1020 may receive signaling indicating a set of multicast configurations for a set of multicast modes supported by the UE, each multicast mode of the set of multicast modes being associated with one or more RRC states and determine a multicast configuration of the set of multicast configurations based on an RRC state according to which the UE is operating. The state component 1025 may identify the RRC state of the UE. The data component 1030 may receive, while operating according to the RRC state, multicast data according to the determined multicast configuration.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
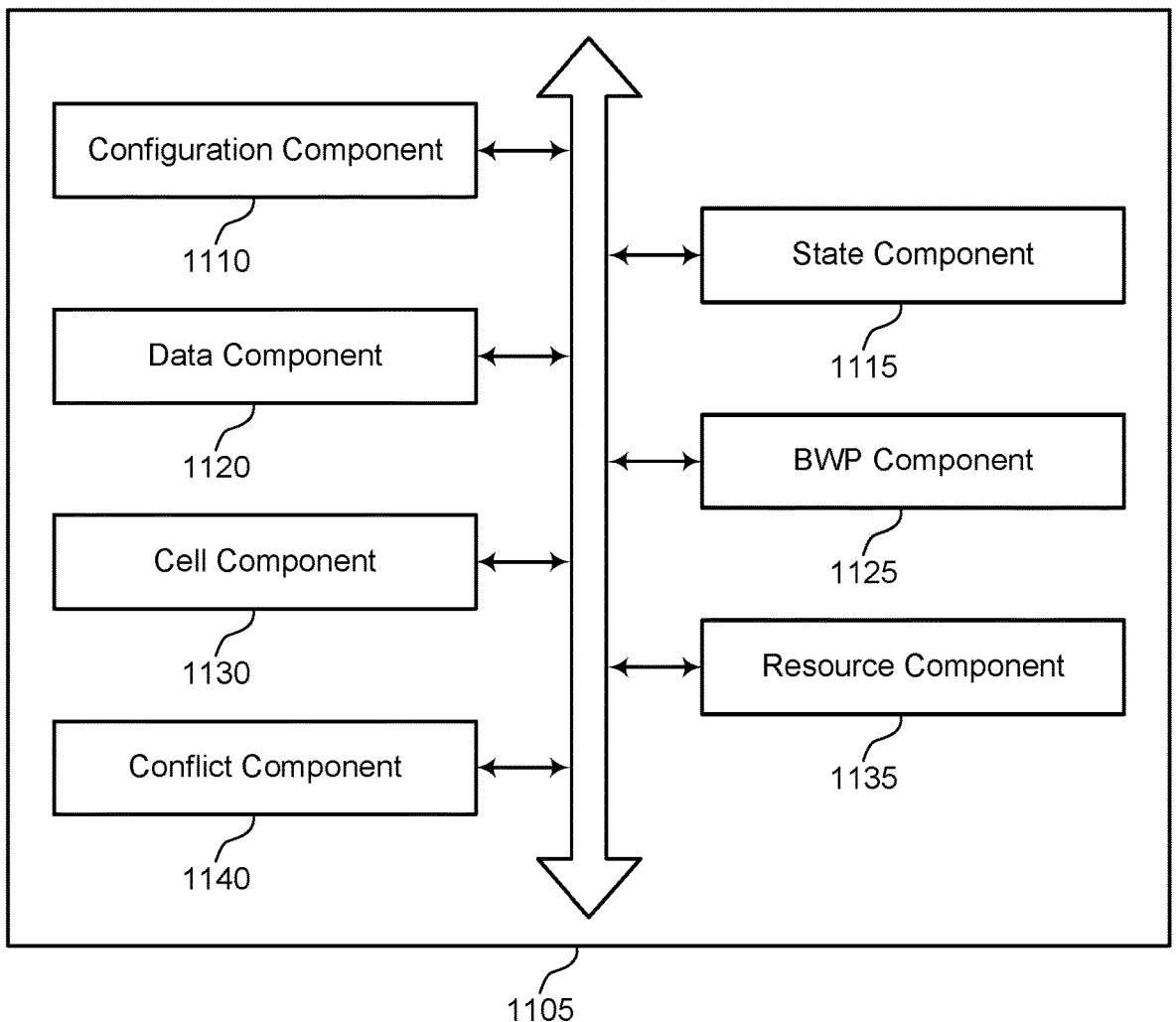
FIG. 11 shows a block diagram of a UE communications manager that supports multicast communications for RRC modes in accordance with aspects of the present disclosure.

FIG. 11 shows a block diagram of a UE communications manager 1105 that supports multicast communications for RRC modes in accordance with aspects of the present disclosure. The UE communications manager 1105 may be an example of aspects of a UE communications manager 915, a UE communications manager 1015, or a UE communications manager 1210 described herein. The UE communications manager 1105 may include a configuration component 1110, a state component 1115, a data component 1120, a BWP component 1125, a cell component 1130, a resource component 1135, and a conflict component 1140. Each of these modules may communicate, directly or indirectly, with one another (for example, via one or more buses).

The configuration component 1110 may receive signaling indicating a set of multicast configurations for a set of multicast modes supported by the UE, each multicast mode of the set of multicast modes being associated with one or more RRC states. In some examples, the configuration component 1110 may determine a multicast configuration of the set of multicast configurations based on an RRC state according to which the UE is operating. In some examples, the configuration component 1110 may receive signaling indicating the multicast configuration in UE-dedicated signaling. In some implementations, the configuration component 1110 may determine that the multicast configuration is associated with a first multicast mode of the set of multicast modes based on the signaling indicating the multicast configuration being received in UE-dedicated signaling. In some examples, the configuration component 1110 may receive signaling indicating the multicast configuration in signaling common to a set of UEs that include the UE. In some implementations, the configuration component 1110 may determine that the multicast configuration is associated with a first multicast mode of the set of multicast modes based on the signaling indicating the multicast configuration being received in signaling common to the set of UEs.

In some examples, the configuration component 1110 may receive values of one or more parameters of the multicast configuration in one or more BWP configurations (for example, BWP-Downlink, BWP-Downlink, or BWP-DownlinkDedicated), or a serving cell configuration (for example, ServingCellConfig, ServingCellConfigCommon, or ServingCellConfigDedicated), or a combination thereof. In some implementations, the multicast configuration includes values of one or more parameters of a multiple input multiple output related configuration, a demodulation reference signal related configuration, a modulation and coding scheme related configuration, a resource allocation related configuration, a transport block size related configuration, an acknowledgment feedback related configuration, or a channel state information feedback configuration. In some examples, the one or more parameters include parameters for the UE to provide acknowledgment feedback for the multicast data. In some examples, a first multicast mode of the set of multicast modes is associated with an RRC connected state, and a second multicast mode of the set of multicast modes is associated with the RRC connected state, an RRC idle state, and an RRC inactive state; or the first multicast mode is associated with the RRC connected state, the RRC idle state, and the RRC inactive state, and the second multicast mode is associated with the RRC connected state.

The state component 1115 may identify an RRC state of the UE.

The data component 1120 may receive, while operating according to the RRC state, multicast data according to the determined multicast configuration. In some examples, the data component 1120 may receive, while operating according to the RRC state, first multicast data of the multicast data according to the determined multicast configuration and second multicast data of the multicast data according to a second multicast configuration of the set of multicast configurations. The BWP component 1125 may receive a first set of values of the one or more parameters for a first BWP configured at the UE. In some examples, the BWP component 1125 may receive a second set of values of the one or more parameters for a second BWP configured at the UE. In some examples, the BWP component 1125 may receive a set of values of the one or more parameters, the set of values applicable to each of a set of BWP s configured at the UE. In some examples, the BWP component 1125 may receive the values of a first parameter of the one or more parameters in the one or more BWP configurations. In some examples, the BWP component 1125 may identify an active BWP for the UE.

In some examples, the BWP component 1125 may determine a value of the first parameter in the one or more BWP configurations corresponding to the active BWP. In some examples, the BWP component 1125 may determine a value of the second parameter in the serving cell configuration regardless of the active BWP. In some examples, the BWP component 1125 may operate the UE in the active BWP according to the determined value of the first parameter and the determined value of the second parameter. In some examples, the BWP component 1125 may identify a multicast signal to be transmitted to the UE in a first BWP. In some examples, the BWP component 1125 may determine that a second BWP different than the first BWP is active for the UE.

In some examples, the BWP component 1125 may refrain from receiving the multicast signal based on determining that the second BWP is active for the UE. In some examples, the BWP component 1125 may switch the first BWP to active to receive the multicast signal based on identifying the multicast signal. In some examples, the BWP component 1125 may monitor a first BWP of a primary cell for the multicast configuration, the first BWP different than an active BWP of the UE.

In some examples, the BWP component 1125 may receive, in the first BWP, the multicast configuration based on the monitoring. In some examples, the BWP component 1125 may monitor an active BWP of the UE for the multicast configuration. In some examples, the BWP component 1125 may receive, in the active BWP, the multicast configuration based on the monitoring.

The cell component 1130 may receive the values of a second parameter of the one or more parameters in the serving cell configuration. The resource component 1135 may identify a control resource set in a first BWP, the control resource set for control information for multicast transmissions for the UE. In some examples, the resource component 1135 may determine that a second BWP different than the first BWP is active for the UE. In some examples, the resource component 1135 may refrain from monitoring the identified control resource set based on determining that the second BWP is active for the UE. In some examples, the resource component 1135 may switch the first BWP to active to monitor the identified control resource set based on identifying the control resource set. The conflict component

1140 may identify, for the RRC state, a conflict between a first value for a parameter indicated by the determined multicast configuration and a second value for the parameter indicated by a second multicast configuration of the set of multicast configurations. In some examples, the conflict component 1140 may select between the first value and the second value for the parameter according to a configuration selection rule.

Figure 12:
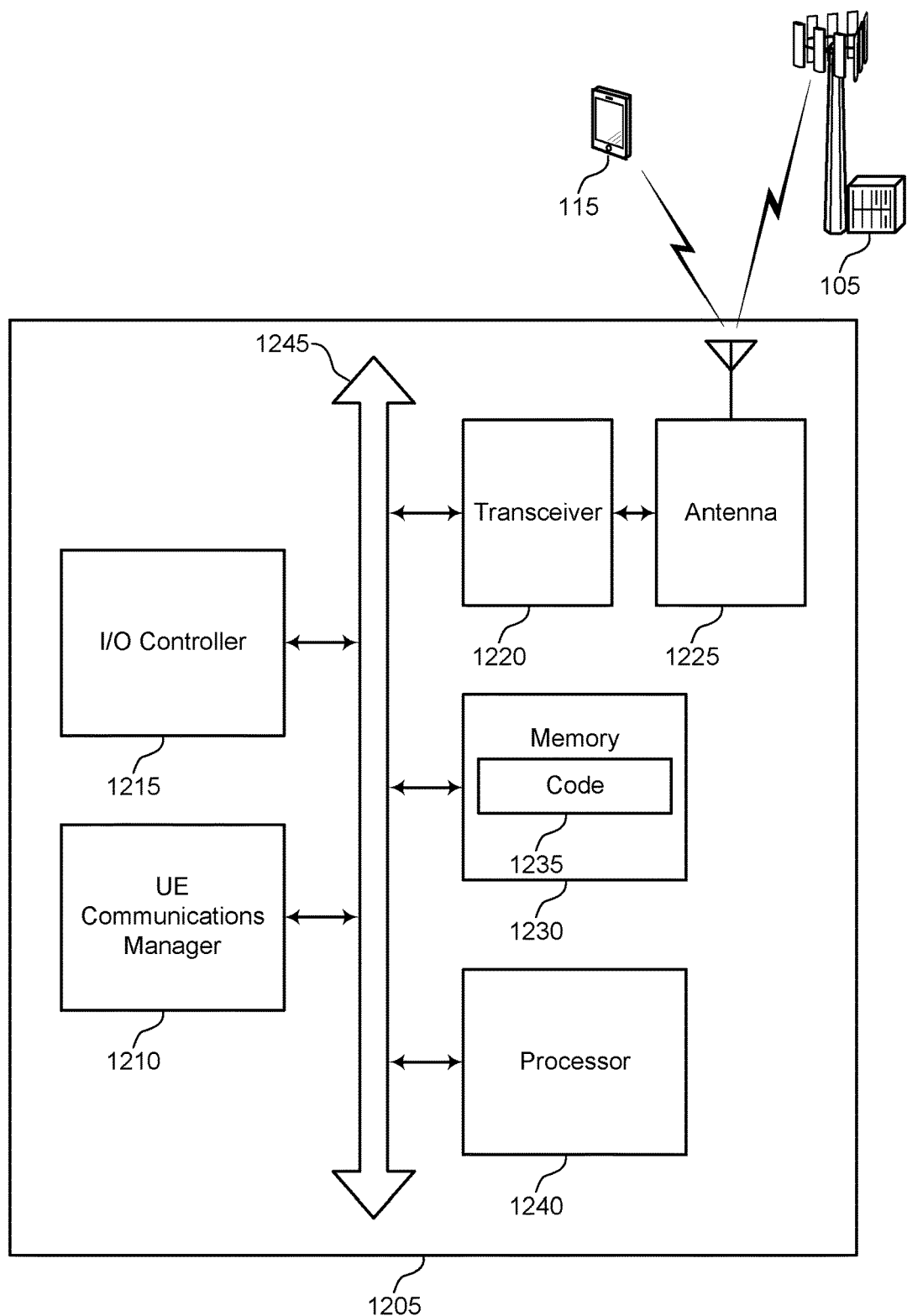
FIG. 12 shows a diagram of a system including a device that supports multicast communications for RRC modes in accordance with aspects of the present disclosure.

FIG. 12 shows a diagram of a system including a device 1205 that supports multicast communications for RRC modes in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a UE communications manager 1210, an I/O controller 1215, a transceiver 1220, an antenna 1225, memory 1230, and a processor 1240. These components may be in electronic communication via one or more buses (for example, bus 1245).

The UE communications manager 1210 may receive signaling indicating a set of multicast configurations for a set of multicast modes supported by the UE, each multicast mode of the set of multicast modes being associated with one or more RRC states, identify an RRC state of the UE, determine a multicast configuration of the set of multicast configurations based on the RRC state, and receive, while operating according to the RRC state, multicast data according to the determined multicast configuration. At least one implementation may enable the UE communications manager 1210 to receive multicast data when operating according to various RRC modes. Based on implementing the receiving, one or more processors of the device 1205 (for example, processor(s) controlling or incorporated with the UE communications manager 1210) may promote improvements to power consumption, spectral efficiency, higher data rates and, in some examples, may promote enhanced efficiency for multicast operations, among other benefits.

The I/O controller 1215 may manage input and output signals for the device 1205. The I/O controller 1215 may also manage peripherals not integrated into the device 1205. In some examples, the I/O controller 1215 may represent a physical connection or port to an external peripheral. In some examples, the I/O controller 1215 may utilize an operating system such as iOS®, ANDROID®, MS-DOS®, MS-WINDOWS®, OS/2®, UNIX®, LINUX®, or another known operating system. In other examples, the I/O controller 1215 may represent or interact with a modem, a keyboard, a mouse, a touchscreen, or a similar device. In some examples, the I/O controller 1215 may be implemented as part of a processor. In some examples, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas. In some examples, the device 1205 may include a single antenna 1225. However, in some examples the device 1205 may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some examples, the memory 1230 may contain, among other things, a basic input/output system (BIOS) which may control basic hardware or software operation such as the interaction with peripheral components or devices.

The processor 1240 may include an intelligent hardware device, (for example, a general-purpose processor, a digital signal processor (DSP), a CPU, a microcontroller, an ASIC, a field-programmable gate array (FPGA), a programmable logic device, a discrete gate or transistor logic component, a discrete hardware component, or any combination thereof). In some examples, the processor 1240 may be configured to operate a memory array using a memory controller. In other examples, a memory controller may be integrated into the processor 1240. The processor 1240 may be configured to execute computer-readable instructions stored in a memory (for example, the memory 1230) to cause the device 1205 to perform various functions (for example, functions or tasks supporting multicast communications for RRC modes).

The code 1235 may include instructions to implement aspects of the present disclosure, including instructions to support wireless communications. The code 1235 may be stored in a non-transitory computer-readable medium such as system memory or other type of memory. In some examples, the code 1235 may not be directly executable by the processor 1240 but may cause a computer (for example, when compiled and executed) to perform functions described herein.

Figure 13:
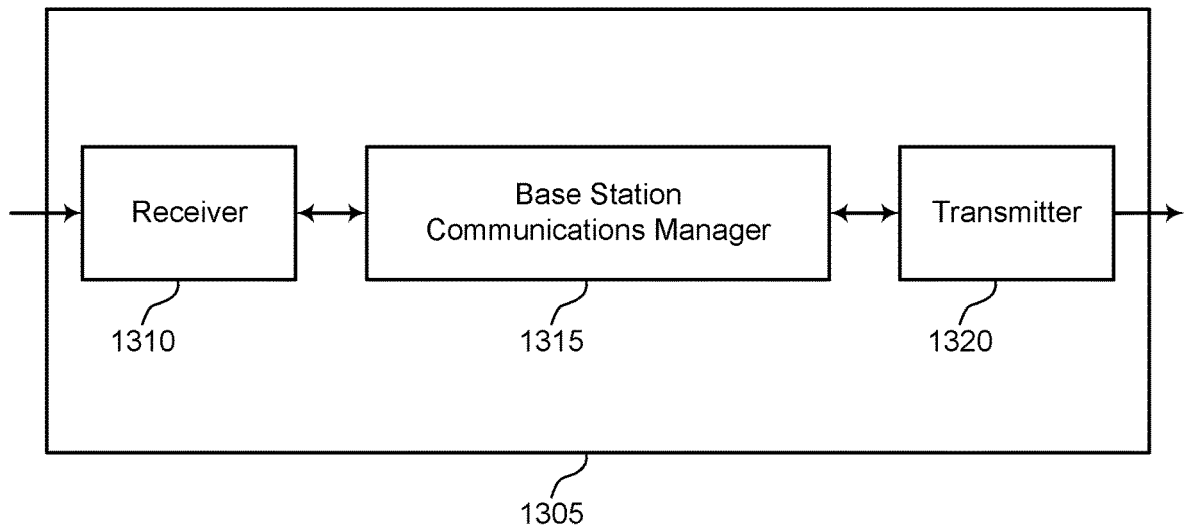
FIGS. 13 and 14 show block diagrams of devices that support multicast communications for RRC modes in accordance with aspects of the present disclosure.

FIG. 13 shows a block diagram of a device 1305 that supports multicast communications for RRC modes in accordance with aspects of the present disclosure. The device 1305 may be an example of aspects of a base station 105 as described herein. The device 1305 may include a receiver 1310, a base station communications manager 1315, and a transmitter 1320. The base station communications manager 1315 can be implemented, at least in part, by one or both of a modem and a processor. Each of these components may be in communication with one another (for example, via one or more buses).

The receiver 1310 may receive information such as packets, user data, or control information associated with various information channels (for example, control channels, data channels, and information related to multicast communications for RRC modes). Information may be passed on to other components of the device 1305. The receiver 1310 may be an example of aspects of the transceiver 1620 described with reference to FIG. 16. The receiver 1310 may utilize a single antenna or a set of antennas.

The base station communications manager 1315 may identify, for a UE, a first multicast mode of a set of multicast modes supported by the base station, each multicast mode of the set of multicast modes associated with one or more RRC states, transmit, to the UE, a multicast configuration according to the first multicast mode, and transmit, to the UE, multicast data according to the transmitted multicast configuration.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
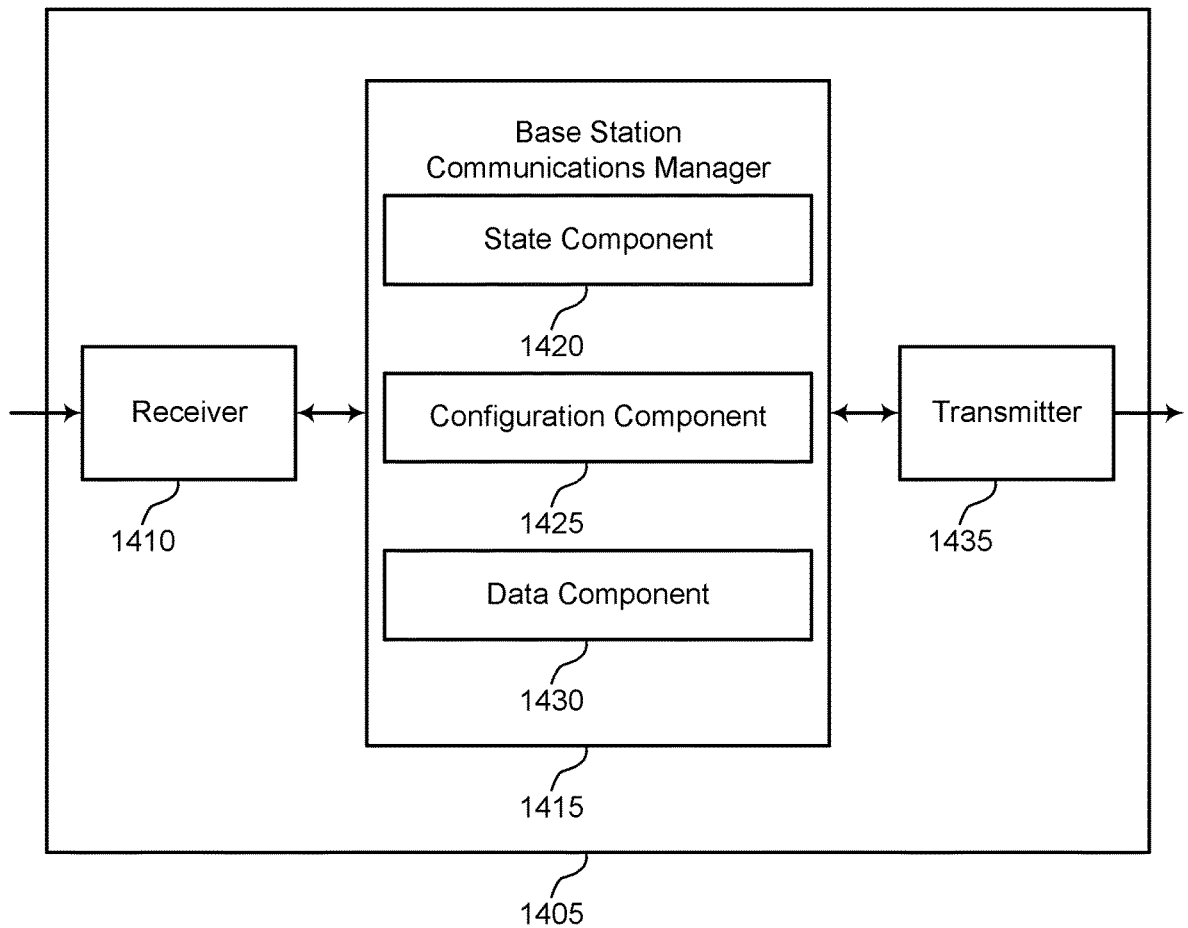

FIG. 14 shows a block diagram of a device 1405 that supports multicast communications for RRC modes in accordance with aspects of the present disclosure. The device 1405 may be an example of aspects of a device 1305, or a base station 105 as described herein. The device 1405 may include a receiver 1410, a base station communications manager 1415, and a transmitter 1435. The base station communications manager 1415 can be implemented, at least in part, by one or both of a modem and a processor. Each of these components may be in communication with one another (for example, via one or more buses).

The receiver 1410 may receive information such as packets, user data, or control information associated with various information channels (for example, control channels, data channels, and information related to multicast communications for RRC modes). Information may be passed on to other components of the device 1405. The receiver 1410 may be an example of aspects of the transceiver 1620 described with reference to FIG. 16. The receiver 1410 may utilize a single antenna or a set of antennas.

The base station communications manager 1415 may include a state component 1420, a configuration component 1425, and a data component 1430.

The state component 1420 may identify, for a UE, a first multicast mode of a set of multicast modes supported by the base station, each multicast mode of the set of multicast modes associated with one or more RRC states. The configuration component 1425 may transmit, to the UE, a multicast configuration according to the first multicast mode. The data component 1430 may transmit, to the UE, multicast data according to the transmitted multicast configuration.

The transmitter 1435 may transmit signals generated by other components of the device 1405. In some examples, the transmitter 1435 may be collocated with a receiver 1410 in a transceiver module. For example, the transmitter 1435 may be an example of aspects of the transceiver 1620 described with reference to FIG. 16. The transmitter 1435 may utilize a single antenna or a set of antennas.

Figure 15:
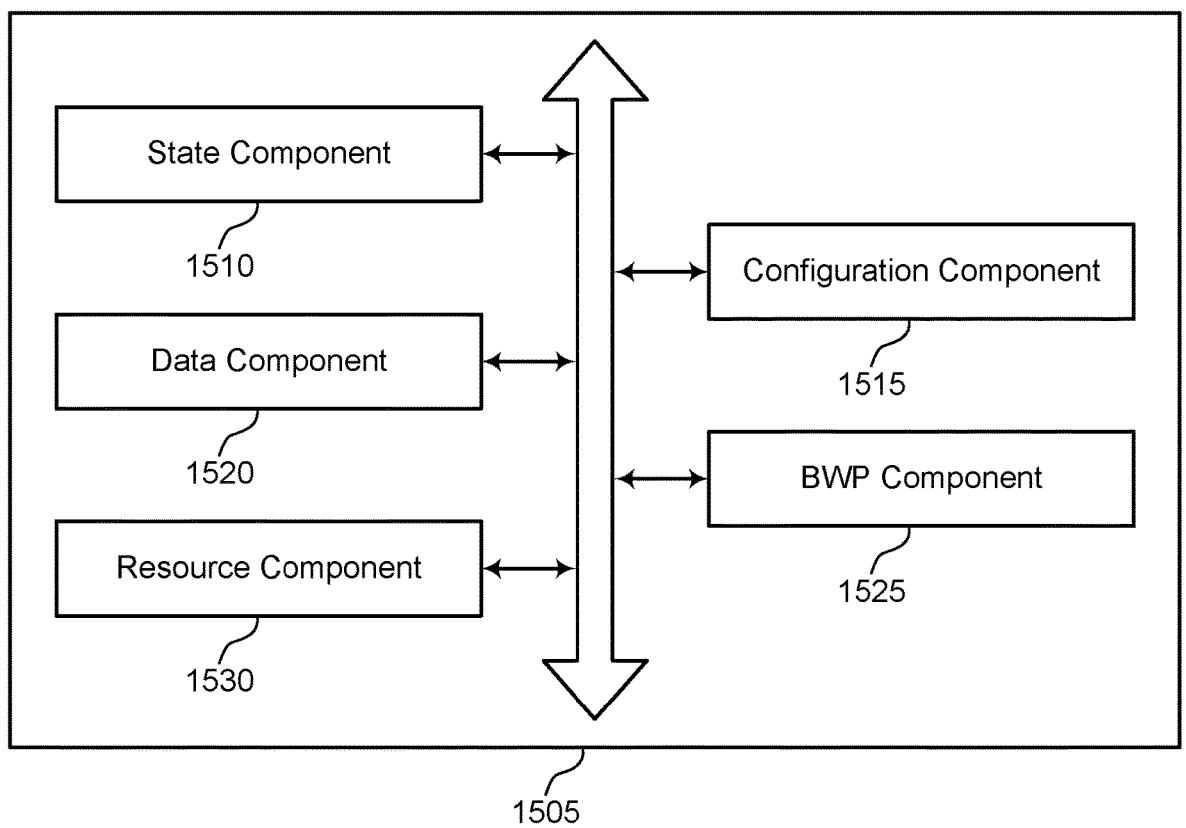
FIG. 15 shows a block diagram of a base station communications manager that supports multicast communications for RRC modes in accordance with aspects of the present disclosure.

FIG. 15 shows a block diagram of a base station communications manager 1505 that supports multicast communications for RRC modes in accordance with aspects of the present disclosure. The base station communications manager 1505 may be an example of aspects of a base station communications manager 1315, a base station communications manager 1415, or a base station communications manager 1610 described herein. The base station communications manager 1505 may include a state component 1510, a configuration component 1515, a data component 1520, a BWP component 1525, and a resource component 1530. Each of these modules may communicate, directly or indirectly, with one another (for example, via one or more buses).

The state component 1510 may identify, for a UE, a first multicast mode of a set of multicast modes supported by the base station, each multicast mode of the set of multicast modes associated with one or more RRC states. In some examples, the state component 1510 may identify that the UE is to operate according to the first multicast mode to receive the multicast data based on the transmission of the multicast configuration according to the first multicast mode includes signaling the multicast configuration in UE-dedicated signaling. In some examples, the state component 1510 may identify that the UE is to operate according to the first multicast mode to receive the multicast data based on the transmission of the multicast configuration according to the first multicast mode includes signaling the multicast configuration in signaling common to a set of UEs, including the UE.

The configuration component 1515 may transmit, to the UE, a multicast configuration according to the first multicast mode. The data component 1520 may transmit, to the UE, multicast data according to the transmitted multicast configuration. The BWP component 1525 may identify a first BWP that is active for the UE, in which the transmission of the multicast configuration according to the first multicast mode includes signaling the multicast configuration to identify that the multicast data is to be transmitted in the first BWP. In some examples, the BWP component 1525 may identify that the multicast data is to be transmitted in the first BWP. In some examples, the BWP component 1525 may identify a second BWP different than the first BWP that is active for the UE. In some examples, the BWP component 1525 may transmit, to the UE, an indication that the UE is to switch from the second BWP being active to the first BWP being active, in which the identification of the first BWP being active for the UE is based on transmitting the indication. In some examples, the BWP component 1525 may identify a first BWP that is active for the UE, in which the multicast configuration identifies a control resource set in the first BWP. In some examples, the BWP component 1525 may identify that a second BWP for the UE is active. The resource component 1530 may identify that control signaling for the multicast data is to be transmitted in the control resource set in the first BWP.

Figure 16:
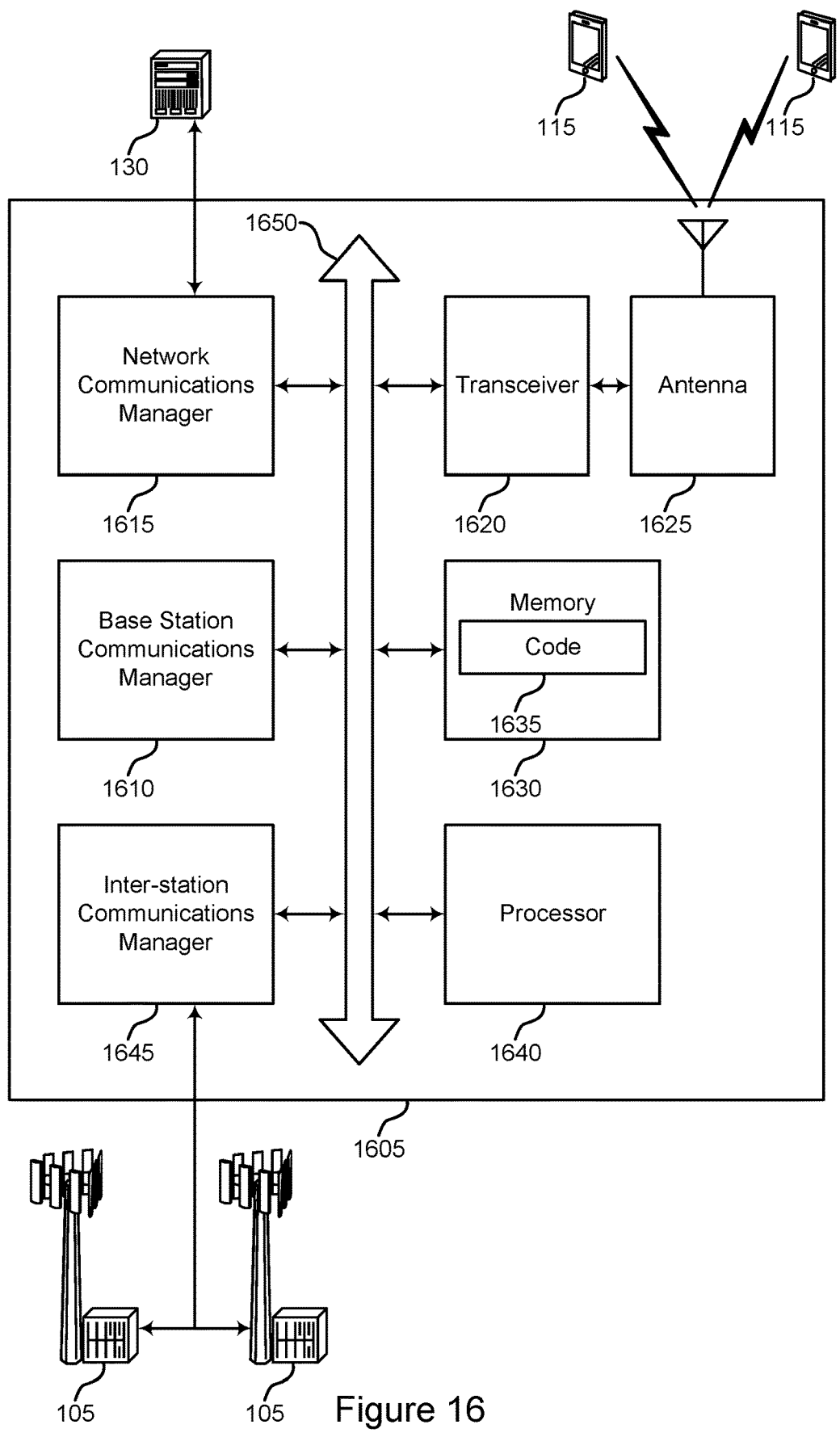
FIG. 16 shows a diagram of a system including a device that supports multicast communications for RRC modes in accordance with aspects of the present disclosure.

FIG. 16 shows a diagram of a system including a device 1605 that supports multicast communications for RRC modes in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a base station communications manager 1610, a network communications manager 1615, a transceiver 1620, an antenna 1625, memory 1630, a processor 1640, and an inter-station communications manager 1645. These components may be in electronic communication via one or more buses (for example, bus 1650).

The base station communications manager 1610 may identify, for a UE, a first multicast mode of a set of multicast modes supported by the base station, each multicast mode of the set of multicast modes associated with one or more RRC states, transmit, to the UE, a multicast configuration according to the first multicast mode, and transmit, to the UE, multicast data according to the transmitted multicast configuration.

The network communications manager 1615 may manage communications with the core network (for example, via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas. In some examples, the device 1605 may include a single antenna 1625. However, in some examples the device 1605 may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (for example, the processor 1640) cause the device to perform various functions described herein. In some examples, the memory 1630 may contain, among other things, a BIOS which may control basic hardware or software operation such as the interaction with peripheral components or devices.

The processor 1640 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1640 may be configured to operate a memory array using a memory controller. In some examples, a memory controller may be integrated into processor 1640. The processor 1640 may be configured to execute computer-readable instructions stored in a memory (for example, the memory 1630) to cause the device 1605 to perform various functions (for example, functions or tasks supporting multicast communications for RRC modes).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some examples, the code 1635 may not be directly executable by the processor 1640 but may cause a computer (for example, when compiled and executed) to perform functions described herein.

Figure 17:
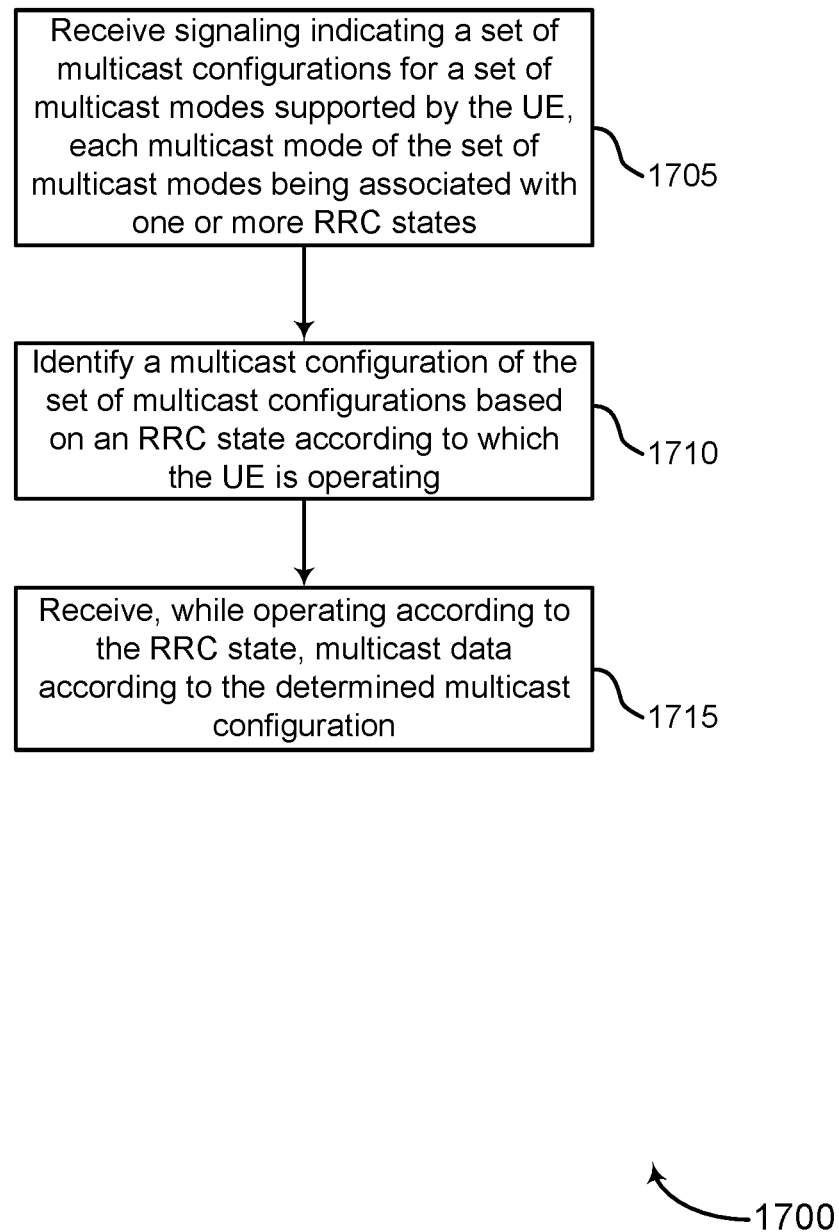
FIGS. 17-22 show flowcharts illustrating methods that support multicast communications for RRC modes in accordance with aspects of the present disclosure.

FIG. 17 shows a flowchart illustrating a method 1700 that supports multicast communications for RRC modes in accordance with aspects of the present disclosure. The operations of method 1700 may be implemented by a UE 115 or its components as described herein. For example, the operations of method 1700 may be performed by a communications manager as described with reference to FIGS. 9-12. In some examples, a UE may execute a set of instructions to control the functional elements of the UE to perform the functions described below. Additionally or alternatively, a UE may perform aspects of the functions described below using special-purpose hardware.

In block 1705, the UE may receive signaling indicating a set of multicast configurations for a set of multicast modes supported by the UE, each multicast mode of the set of multicast modes being associated with one or more RRC states. The operations of 1705 may be performed according to the methods described herein. In some examples, aspects of the operations of 1705 may be performed by a configuration component as described with reference to FIGS. 9-12.

In block 1710, the UE may determine a multicast configuration of the set of multicast configurations based on an RRC state according to which the UE is operating. The operations of 1715 may be performed according to the methods described herein. In some examples, aspects of the operations of 1715 may be performed by a configuration component as described with reference to FIGS. 9-12.

In block 1715, the UE may receive, while operating according to the RRC state, multicast data according to the determined multicast configuration. The operations of 1720 may be performed according to the methods described herein. In some examples, aspects of the operations of 1720 may be performed by a data component as described with reference to FIGS. 9-12.

Figure 18:
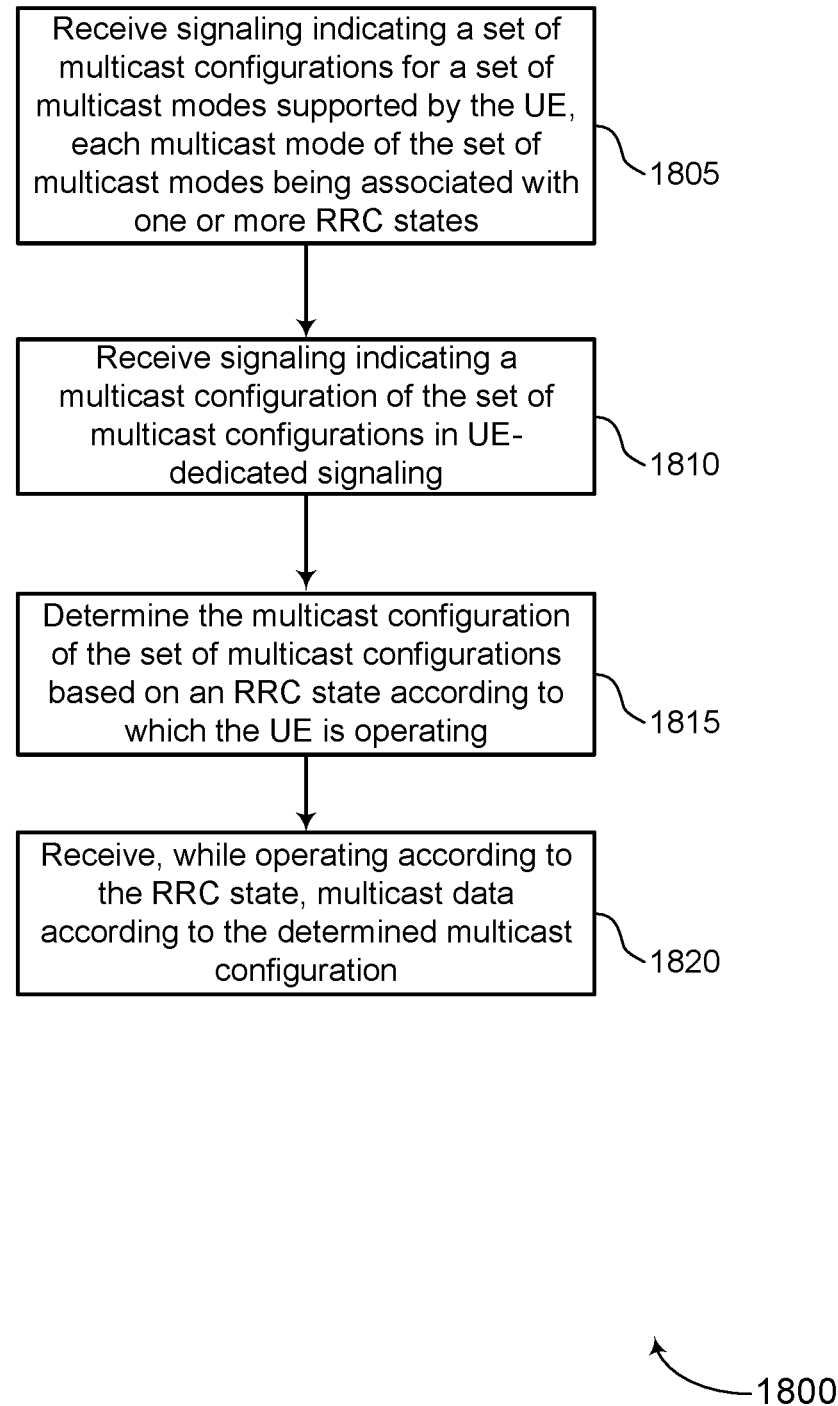

FIG. 18 shows a flowchart illustrating a method 1800 that supports multicast communications for RRC modes in accordance with aspects of the present disclosure. The operations of method 1800 may be implemented by a UE 115 or its components as described herein. For example, the operations of method 1800 may be performed by a communications manager as described with reference to FIGS. 9-12. In some examples, a UE may execute a set of instructions to control the functional elements of the UE to perform the functions described below. Additionally or alternatively, a UE may perform aspects of the functions described below using special-purpose hardware.

In block 1805, the UE may receive signaling indicating a set of multicast configurations for a set of multicast modes supported by the UE, each multicast mode of the set of multicast modes being associated with one or more RRC states. The operations of 1805 may be performed according to the methods described herein. In some examples, aspects of the operations of 1805 may be performed by a configuration component as described with reference to FIGS. 9-12.

In block 1810, the UE may receive signaling indicating a multicast configuration of the set of multicast configurations in UE-dedicated signaling. In some examples, the UE may determine that the multicast configuration is associated with a first multicast mode of the set of multicast modes based on the signaling indicating the multicast configuration being received in the UE-dedicated signaling. The operations of 1810 may be performed according to the methods described herein. In some examples, aspects of the operations of 1810 may be performed by a configuration component as described with reference to FIGS. 9-12.

In block 1815, the UE may determine a multicast configuration of the set of multicast configurations based on an RRC state according to which the UE is operating. The operations of 1820 may be performed according to the methods described herein. In some examples, aspects of the operations of 1820 may be performed by a configuration component as described with reference to FIGS. 9-12.

In block 1820, the UE may receive, while operating according to the RRC state, multicast data according to the determined multicast configuration. The operations of 1825 may be performed according to the methods described herein. In some examples, aspects of the operations of 1825 may be performed by a data component as described with reference to FIGS. 9-12.

Figure 19:
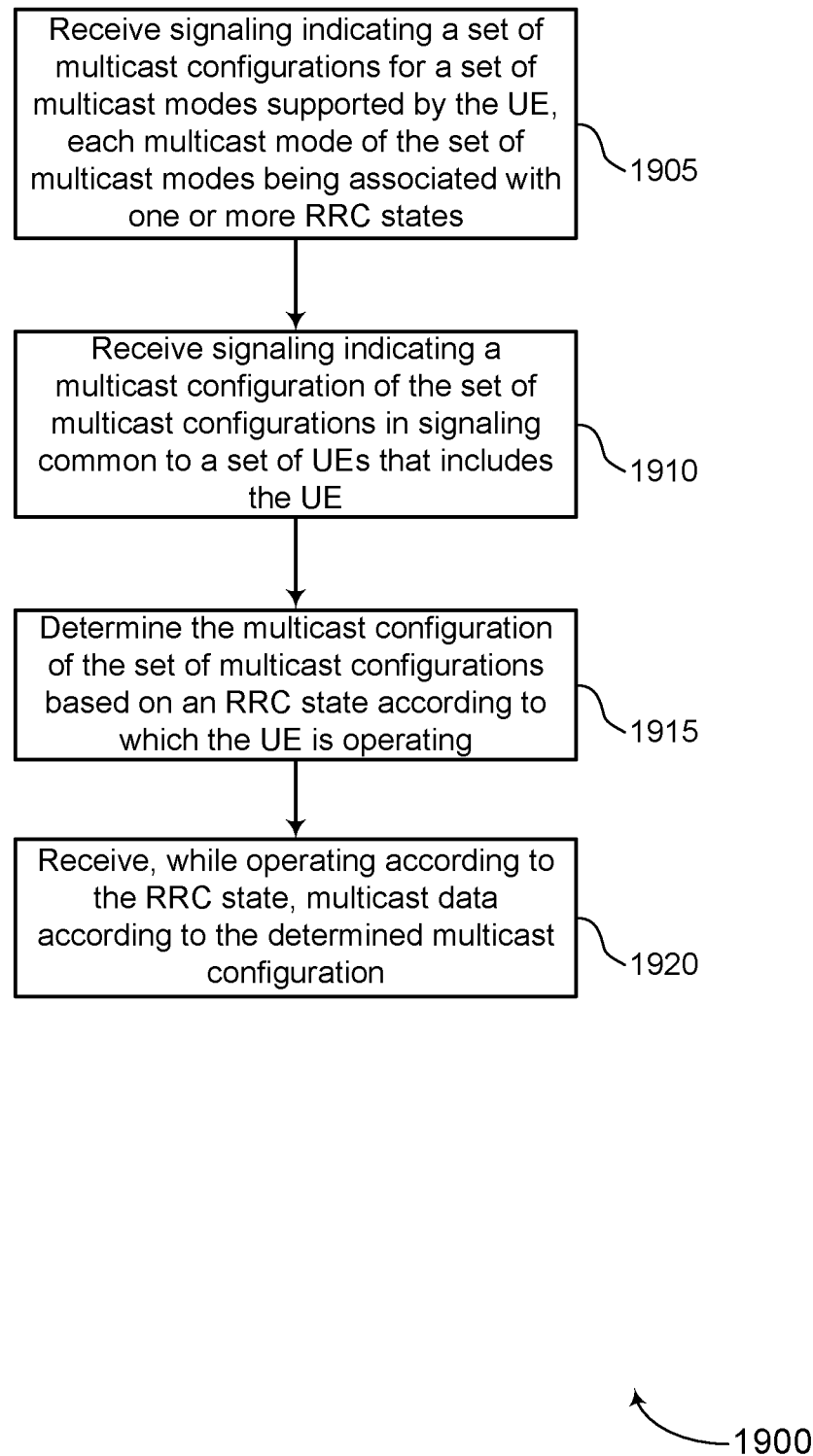

FIG. 19 shows a flowchart illustrating a method 1900 that supports multicast communications for RRC modes in accordance with aspects of the present disclosure. The operations of method 1900 may be implemented by a UE 115 or its components as described herein. For example, the operations of method 1900 may be performed by a communications manager as described with reference to FIGS. 9-12. In some examples, a UE may execute a set of instructions to control the functional elements of the UE to perform the functions described below. Additionally or alternatively, a UE may perform aspects of the functions described below using special-purpose hardware.

In block 1905, the UE may receive a set of multicast configurations for a set of multicast modes supported by the UE, each multicast mode of the set of multicast modes associated with one or more RRC states. The operations of 1905 may be performed according to the methods described herein. In some examples, aspects of the operations of 1905 may be performed by a configuration component as described with reference to FIGS. 9-12.

In block 1910, the UE may receive signaling indicating a multicast configuration of the set of multicast configurations in signaling common to a set of UEs that includes the UE. In some examples, the UE may determine that the multicast configuration is associated with a first multicast mode of the set of multicast modes based on the signaling indicating the multicast configuration being received in signaling common to the set of UEs. The operations of 1910 may be performed according to the methods described herein. In some examples, aspects of the operations of 1910 may be performed by a configuration component as described with reference to FIGS. 9-12.

In block 1915, the UE may determine a multicast configuration of the set of multicast configurations based on an RRC state according to which the UE is operating. The operations of 1920 may be performed according to the methods described herein. In some examples, aspects of the operations of 1920 may be performed by a configuration component as described with reference to FIGS. 9-12.

In block 1920, the UE may receive, while operating according to the RRC state, multicast data according to the determined multicast configuration. The operations of 1925 may be performed according to the methods described herein. In some examples, aspects of the operations of 1925 may be performed by a data component as described with reference to FIGS. 9-12.

Figure 20:
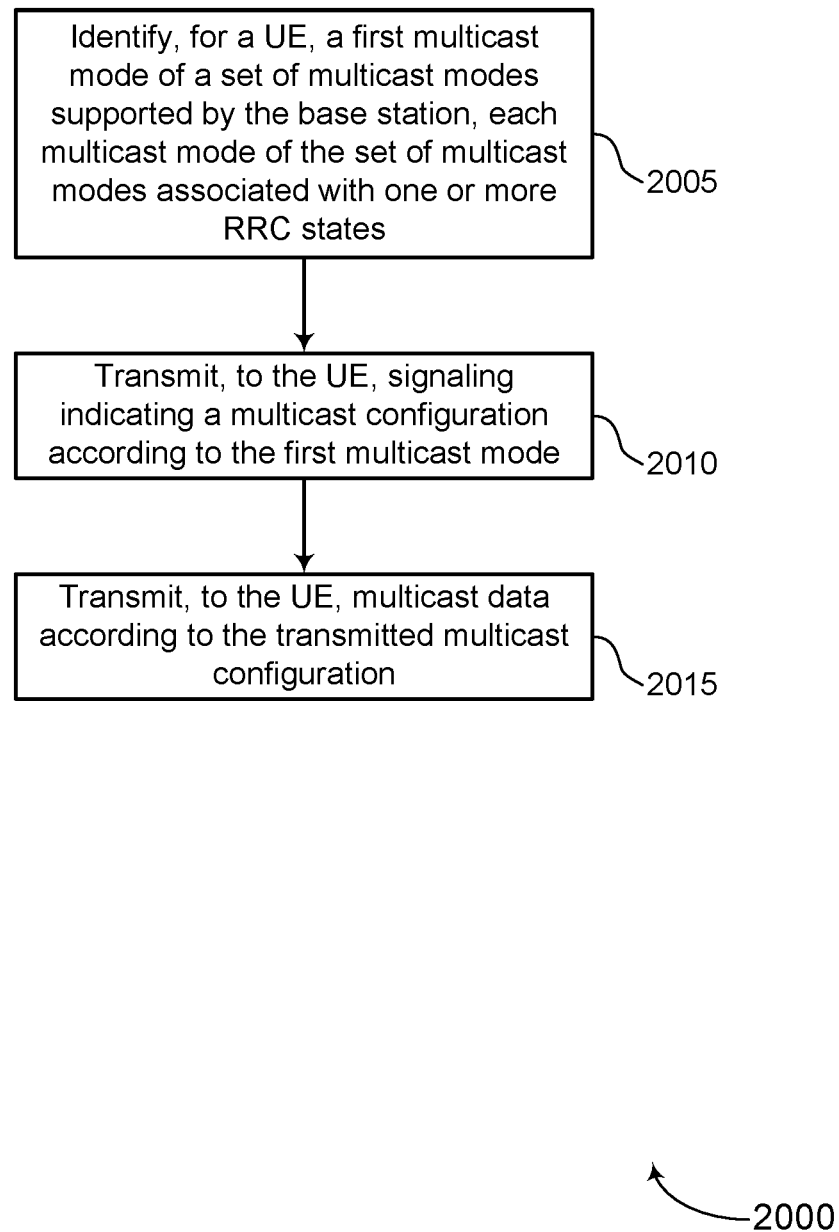

FIG. 20 shows a flowchart illustrating a method 2000 that supports multicast communications for RRC modes in accordance with aspects of the present disclosure. The operations of method 2000 may be implemented by a base station 105 or its components as described herein. For example, the operations of method 2000 may be performed by a communications manager as described with reference to FIGS. 13-16. In some examples, a base station may execute a set of instructions to control the functional elements of the base station to perform the functions described below. Additionally or alternatively, a base station may perform aspects of the functions described below using special-purpose hardware.

In block 2005, the base station may identify, for a UE, a first multicast mode of a set of multicast modes supported by the base station, each multicast mode of the set of multicast modes associated with one or more RRC states. The operations of 2005 may be performed according to the methods described herein. In some examples, aspects of the operations of 2005 may be performed by a state component as described with reference to FIGS. 13-16.

In block 2010, the base station may transmit, to the UE, signaling indicating a multicast configuration according to the first multicast mode. The operations of 2010 may be performed according to the methods described herein. In some examples, aspects of the operations of 2010 may be performed by a configuration component as described with reference to FIGS. 13-16.

In block 2015, the base station may transmit, to the UE, multicast data according to the transmitted multicast configuration. The operations of 2015 may be performed according to the methods described herein. In some examples, aspects of the operations of 2015 may be performed by a data component as described with reference to FIGS. 13-16.

Figure 21:
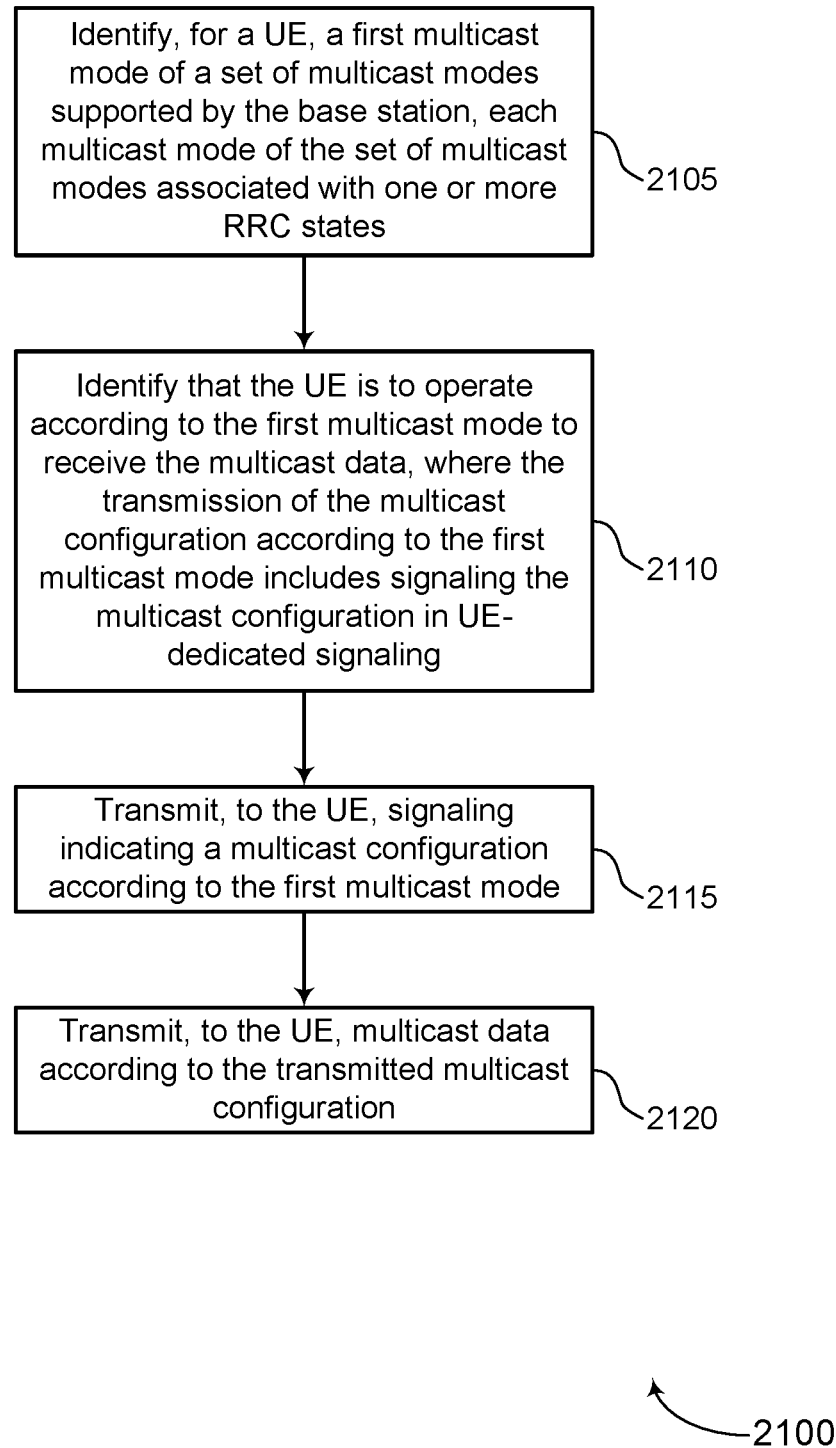

FIG. 21 shows a flowchart illustrating a method 2100 that supports multicast communications for RRC modes in accordance with aspects of the present disclosure. The operations of method 2100 may be implemented by a base station 105 or its components as described herein. For example, the operations of method 2100 may be performed by a communications manager as described with reference to FIGS. 13-16. In some examples, a base station may execute a set of instructions to control the functional elements of the base station to perform the functions described below. Additionally or alternatively, a base station may perform aspects of the functions described below using special-purpose hardware.

In block 2105, the base station may identify, for a UE, a first multicast mode of a set of multicast modes supported by the base station, each multicast mode of the set of multicast modes associated with one or more RRC states. The operations of 2105 may be performed according to the methods described herein. In some examples, aspects of the operations of 2105 may be performed by a state component as described with reference to FIGS. 13-16.

In block 2110, the base station may identify that the UE is to operate according to the first multicast mode to receive the multicast data, where the transmission of the signaling indicating the multicast configuration according to the first multicast mode includes signaling the multicast configuration in UE-dedicated signaling. The operations of 2110 may be performed according to the methods described herein. In some examples, aspects of the operations of 2110 may be performed by a state component as described with reference to FIGS. 13-16.

In block 2115, the base station may transmit, to the UE, a multicast configuration according to the first multicast mode. The operations of 2115 may be performed according to the methods described herein. In some examples, aspects of the operations of 2115 may be performed by a configuration component as described with reference to FIGS. 13-16.

In block 2120, the base station may transmit, to the UE, multicast data according to the transmitted multicast configuration. The operations of 2120 may be performed according to the methods described herein. In some examples, aspects of the operations of 2120 may be performed by a data component as described with reference to FIGS. 13-16.

Figure 22:
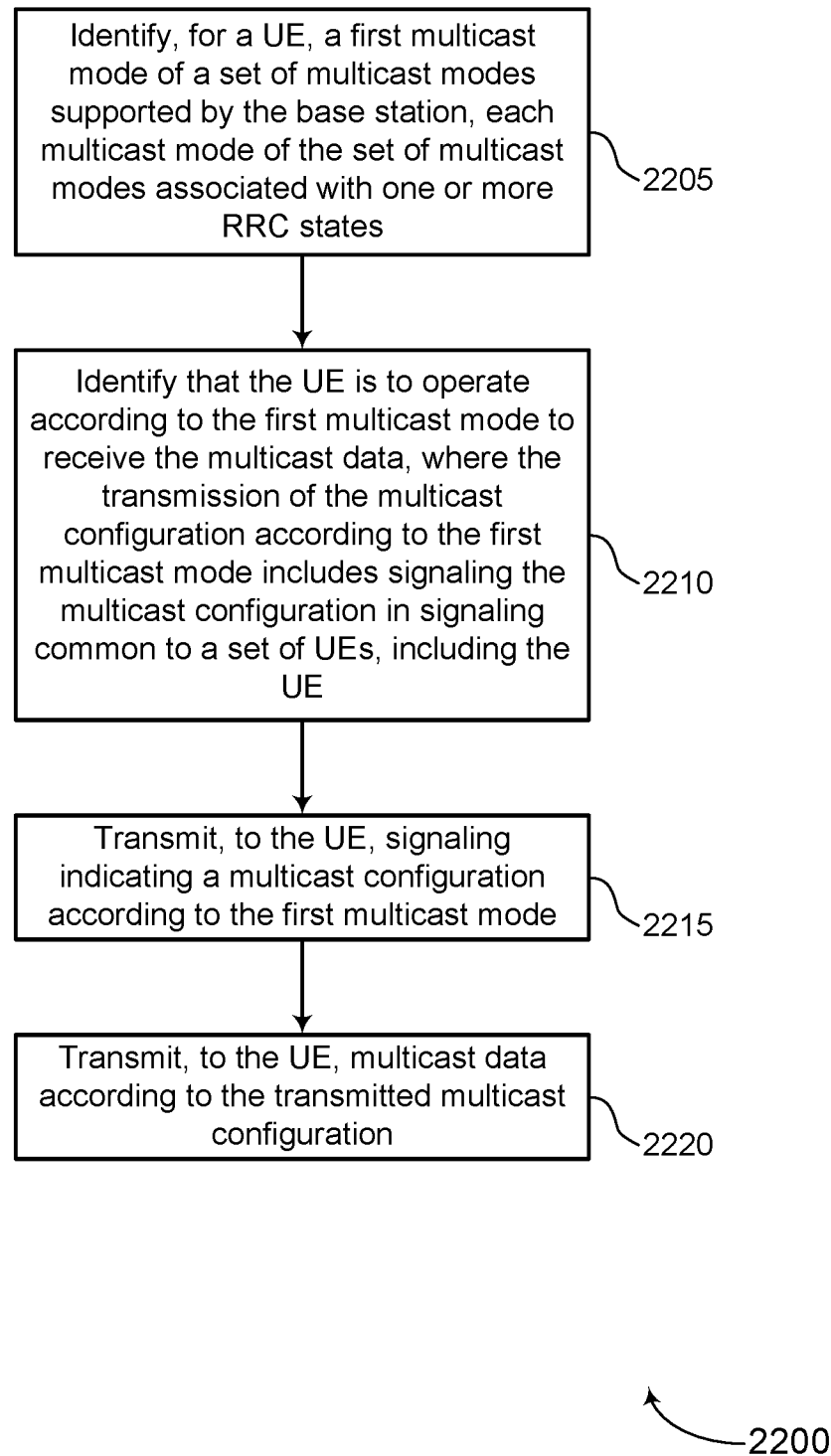

FIG. 22 shows a flowchart illustrating a method 2200 that supports multicast communications for RRC modes in accordance with aspects of the present disclosure. The operations of method 2200 may be implemented by a base station 105 or its components as described herein. For example, the operations of method 2200 may be performed by a communications manager as described with reference to FIGS. 13-16. In some examples, a base station may execute a set of instructions to control the functional elements of the base station to perform the functions described below. Additionally or alternatively, a base station may perform aspects of the functions described below using special-purpose hardware.

In block 2205, the base station may identify, for a UE, a first multicast mode of a set of multicast modes supported by the base station, each multicast mode of the set of multicast modes associated with one or more RRC states. The operations of 2205 may be performed according to the methods described herein. In some examples, aspects of the operations of 2205 may be performed by a state component as described with reference to FIGS. 13-16.

In block 2210, the base station may identify that the UE is to operate according to the first multicast mode to receive the multicast data, where the transmission of the signaling indicating the multicast configuration according to the first multicast mode includes signaling the multicast configuration in signaling common to a set of UEs, including the UE. The operations of 2210 may be performed according to the methods described herein. In some examples, aspects of the operations of 2210 may be performed by a state component as described with reference to FIGS. 13-16.

In block 2215, the base station may transmit, to the UE, a multicast configuration according to the first multicast mode. The operations of 2215 may be performed according to the methods described herein. In some examples, aspects of the operations of 2215 may be performed by a configuration component as described with reference to FIGS. 13-16.

In block 2220, the base station may transmit, to the UE, multicast data according to the transmitted multicast configuration. The operations of 2220 may be performed according to the methods described herein. In some examples, aspects of the operations of 2220 may be performed by a data component as described with reference to FIGS. 13-16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a network device, signaling indicating a plurality of multicast configurations for a plurality of multicast modes supported by the UE, each multicast mode of the plurality of multicast modes being associated with one or more radio resource control (RRC) states; and
   receiving, while operating according to an RRC state of the one or more RRC states and from the network device via a physical downlink shared channel, multicast data according to a multicast configuration of the plurality of multicast configurations, the multicast configuration being based at least in part on the RRC state.

2. The method of claim 1, wherein receiving the signaling indicating the plurality of multicast configurations comprises:
   receiving signaling indicating the multicast configuration in UE-dedicated signaling, the method further comprising:
      determining that the multicast configuration is associated with a first multicast mode of the plurality of multicast modes based at least in part on the signaling indicating the multicast configuration being received in UE-dedicated signaling.

3. The method of claim 1, wherein receiving the signaling indicating the plurality of multicast configurations comprises:
   receiving signaling indicating the multicast configuration in signaling common to a plurality of UEs that include the UE, the method further comprising:
      determining that the multicast configuration is associated with a first multicast mode of the plurality of multicast modes based at least in part on the signaling indicating the multicast configuration being received in signaling common to the plurality of UEs.

4. The method of claim 1, wherein the multicast configuration comprises values of one or more parameters of a multiple input multiple output related configuration, a demodulation reference signal related configuration, a modulation and coding scheme related configuration, a resource allocation related configuration, a transport block size related configuration, an acknowledgment feedback related configuration, or a channel state information feedback configuration.

5. The method of claim 1, wherein receiving the signaling indicating the plurality of multicast configurations comprises receiving values of one or more parameters of the multicast configuration in one or more bandwidth part configurations, or a serving cell configuration, or a combination thereof.

6. The method of claim 5, wherein receiving the values of the one or more parameters of the multicast configuration in the one or more bandwidth part configurations comprises:
   receiving a first set of values of the one or more parameters for a first bandwidth part configured at the UE; and
   receiving a second set of values of the one or more parameters for a second bandwidth part configured at the UE.

7. The method of claim 5, wherein receiving the values of the one or more parameters of the multicast configuration in the serving cell configuration comprises receiving a set of values of the one or more parameters, the set of values applicable to each of a plurality of bandwidth parts configured at the UE.

8. The method of claim 5, wherein receiving the values of the one or more parameters of the multicast configuration in the combination of the one or more bandwidth part configurations and the serving cell configuration comprises:
   receiving the values of a first parameter of the one or more parameters in the one or more bandwidth part configurations; and
   receiving the values of a second parameter of the one or more parameters in the serving cell configuration.

9. The method of claim 8, further comprising:
   identifying an active bandwidth part for the UE;
   determining a value of the first parameter in the one or more bandwidth part configurations corresponding to the active bandwidth part;
   determining a value of the second parameter in the serving cell configuration regardless of the active bandwidth part; and
   operating the UE in the active bandwidth part according to the determined value of the first parameter and the determined value of the second parameter.

10. The method of claim 5, wherein the one or more parameters comprise parameters for the UE to provide acknowledgment feedback for the multicast data.

11. The method of claim 1, further comprising:
   identifying a multicast signal to be transmitted to the UE in a first bandwidth part;
   determining that a second bandwidth part different than the first bandwidth part is active for the UE; and
   refraining from receiving the multicast signal based at least in part on determining that the second bandwidth part is active for the UE.

12. The method of claim 1, further comprising:
   identifying a multicast signal to be transmitted to the UE in a first bandwidth part;
   determining that a second bandwidth part different than the first bandwidth part is active for the UE; and switching the first bandwidth part to active to receive the multicast signal based at least in part on identifying the multicast signal.

13. The method of claim 1, further comprising:
identifying a control resource set in a first bandwidth part, the control resource set for control information for multicast transmissions for the UE;
determining that a second bandwidth part different than the first bandwidth part is active for the UE; and
refraining from monitoring the identified control resource set based at least in part on determining that the second bandwidth part is active for the UE.

14. The method of claim 1, further comprising:
identifying a control resource set in a first bandwidth part, the control resource set for control information for multicast transmissions for the UE;
determining that a second bandwidth part different than the first bandwidth part is active for the UE; and
switching the first bandwidth part to active to monitor the identified control resource set based at least in part on identifying the control resource set.

15. The method of claim 1, further comprising:
monitoring a first bandwidth part of a primary cell for the multicast configuration, the first bandwidth part different than an active bandwidth part of the UE; and
receiving, in the first bandwidth part, the multicast configuration based at least in part on the monitoring.

16. The method of claim 1, further comprising:
monitoring an active bandwidth part of the UE for the multicast configuration; and
receiving, in the active bandwidth part, signaling indicating the multicast configuration based at least in part on the monitoring.

17. The method of claim 1, further comprising:
identifying, for the RRC state, a conflict between a first value for a parameter indicated by the multicast configuration and a second value for the parameter indicated by a second multicast configuration of the plurality of multicast configurations; and
selecting between the first value and the second value for the parameter according to a configuration selection rule.

18. The method of claim 1, further comprising receiving, while operating according to the RRC state, first multicast data of the multicast data according to the multicast configuration and second multicast data of the multicast data according to a second multicast configuration of the plurality of multicast configurations.

19. The method of claim 1, wherein:
a first multicast mode of the plurality of multicast modes is associated with an RRC connected state, and a second multicast mode of the plurality of multicast modes is associated with the RRC connected state, an RRC idle state, and an RRC inactive state; or
the first multicast mode is associated with the RRC connected state, the RRC idle state, and the RRC inactive state, and the second multicast mode is associated with the RRC connected state.

20. A method for wireless communication at a network device, comprising:
determining, for a user equipment (UE), a first multicast mode of a plurality of multicast modes supported by the network device, each multicast mode of the plurality of multicast modes associated with one or more radio resource control (RRC) states;
transmitting signaling indicating a multicast configuration according to the first multicast mode; and
transmitting, via a physical downlink shared channel, multicast data according to the transmitted multicast configuration.

21. The method of claim 20, further comprising identifying that the UE is to operate according to the first multicast mode to receive the multicast data, wherein the transmission of the multicast configuration according to the first multicast mode comprises signaling the multicast configuration in UE-dedicated signaling.

22. The method of claim 20, further comprising identifying that the UE is to operate according to the first multicast mode to receive the multicast data, wherein the transmission of the multicast configuration according to the first multicast mode comprises signaling the multicast configuration in signaling common to a plurality of UEs, including the UE.

23. The method of claim 20, further comprising identifying a first bandwidth part that is active for the UE, wherein the transmission of the multicast configuration according to the first multicast mode comprises signaling the multicast configuration to identify that the multicast data is to be transmitted in the first bandwidth part.

24. The method of claim 23, further comprising:
identifying that the multicast data is to be transmitted in the first bandwidth part;
identifying a second bandwidth part different than the first bandwidth part that is active for the UE; and
transmitting, to the UE, an indication that the UE is to switch from the second bandwidth part being active to the first bandwidth part being active, wherein the identification of the first bandwidth part being active for the UE is based at least in part on transmitting the indication.

25. The method of claim 20, further comprising identifying a first bandwidth part that is active for the UE, wherein the multicast configuration identifies a control resource set in the first bandwidth part.

26. The method of claim 25, further comprising:
identifying that control signaling for the multicast data is to be transmitted in the control resource set in the first bandwidth part;
identifying that a second bandwidth part for the UE is active; and
transmitting, to the UE, an indication that the UE is to switch from the second bandwidth part being active to the first bandwidth part being active, wherein the identification of the first bandwidth part being active for the UE is based at least in part on transmitting the indication.

27. An apparatus for wireless communication, comprising:
a processor,
memory coupled with the processor; and
instructions stored in the memory and executable by the processor to cause the apparatus to:
receive, from a network device, signaling indicating a plurality of multicast configurations for a plurality of multicast modes supported by the apparatus, each multicast mode of the plurality of multicast modes being associated with one or more radio resource control (RRC) states; and
receiving, while operating according to an RRC state of the one or more RRC states and from the network device via a physical downlink shared channel, multicast data according to a multicast configuration of the plurality of multicast configurations, the multicast configuration being based at least in part on the RRC state.

28. The apparatus of claim 27, wherein the instructions to receive the signaling indicating the plurality of multicast configurations are executable by the processor to cause the apparatus to receive signaling indicating the multicast configuration in user equipment (UE)-dedicated signaling, the instructions further executable by the processor to cause the apparatus to:
   determine that the multicast configuration is associated with a first multicast mode of the plurality of multicast modes based at least in part on the signaling indicating the multicast configuration being received in UE-dedicated signaling.

29. The apparatus of claim 27, wherein the instructions to receive the signaling indicating the multicast configuration are executable by the processor to cause the apparatus to receive signaling indicating the multicast configuration in signaling common to a plurality of apparatuses that include the apparatus, the instructions further executable by the processor to cause the apparatus to:
   determine that the multicast configuration is associated with a first multicast mode of the plurality of multicast modes based at least in part on the signaling indicating the multicast configuration being received in signaling common to the plurality of apparatuses.

30. An apparatus for wireless communication, comprising:
   a processor,
   memory coupled with the processor; and
   instructions stored in the memory and executable by the processor to cause the apparatus to:
      identify, for a user equipment (UE), a first multicast mode of a plurality of multicast modes supported by the apparatus, each multicast mode of the plurality of multicast modes associated with one or more radio resource control (RRC) states;
      transmit a multicast configuration according to the first multicast mode; and
      transmit, via a physical downlink shared channel, multicast data according to the transmitted multicast configuration.

* * * * *